US012585743B2

(12) United States Patent
Hu et al.

(10) Patent No.: US 12,585,743 B2
(45) Date of Patent: Mar. 24, 2026

(54) INTERFACE ACCESS PROCESSING METHOD, COMPUTER DEVICE AND STORAGE MEDIUM

(71) Applicant: Beijing Volcano Engine Technology Co., Ltd., Beijing (CN)

(72) Inventors: Yuanming Hu, Beijing (CN); Xuetong Liu, Beijing (CN); Xiaodong Su, Beijing (CN); Minglei Li, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/885,396

(22) Filed: Sep. 13, 2024

(65) Prior Publication Data

US 2025/0131072 A1 Apr. 24, 2025

(30) Foreign Application Priority Data

Oct. 19, 2023 (CN) .......................... 202311360337.9

(51) Int. Cl.
*G06F 21/31* (2013.01)
*G06F 40/20* (2020.01)

(52) U.S. Cl.
CPC ............ *G06F 21/316* (2013.01); *G06F 40/20* (2020.01)

(58) Field of Classification Search
CPC ................................ G06F 21/316; G06F 40/20
See application file for complete search history.

(56) References Cited

U.S. PATENT DOCUMENTS

| | | | | |
|---|---|---|---|---|
| 10,885,167 | B1* | 1/2021 | Lador | G06F 21/554 |
| 2020/0074821 | A1* | 3/2020 | Horgan | G08B 29/22 |
| 2020/0274898 | A1* | 8/2020 | Xie | H04L 63/1458 |
| 2020/0410054 | A1* | 12/2020 | Kumar | G06F 40/30 |
| 2021/0011829 | A1* | 1/2021 | Nair | G06F 11/3013 |
| 2021/0110288 | A1* | 4/2021 | Poothiyot | G06F 8/20 |
| 2021/0365677 | A1* | 11/2021 | Anzenberg | G06N 3/045 |

(Continued)

OTHER PUBLICATIONS

Falk, Eric, et al. "Your Moves, Your Device: Establishing Behavior Profiles Using Tensors." Advanced Data Mining and Applications: 13th International Conference, ADMA 2017, Singapore, Nov. 5-6, 2017, pp. 460-474. (Year: 2017).*

(Continued)

*Primary Examiner* — Omar F Fernandez Rivas
*Assistant Examiner* — Michael C. Lee
(74) *Attorney, Agent, or Firm* — BakerHostetler

(57) ABSTRACT

The present disclosure provides an interface access processing method and apparatus, a computer device and a storage medium, and the method includes: acquiring target access behavior sequences of an access party within a first specified time range, the target access behavior sequences including an access action behavior sequence and an access time interval sequence; calling an identification model for prediction processing to obtain an identification result based on the access action sequence and the access time interval sequence, the identification result being used for representing a classification probability that the access party has abnormal behaviors; and controlling an interface access request within a second specified time range of the access party according to the identification result, a start time of the second specified time range being later than an end time of the first specified time range.

20 Claims, 10 Drawing Sheets

(56) References Cited

U.S. PATENT DOCUMENTS

| 2022/0138185 A1* | 5/2022 | Tran ........................ G06F 40/56 |
| | | 706/18 |
| 2023/0027527 A1* | 1/2023 | Chen ..................... G06F 21/316 |
| 2023/0073643 A1* | 3/2023 | Kommer ................. G06N 7/01 |
| 2023/0244942 A1* | 8/2023 | Yu .......................... G06N 3/063 |
| | | 706/15 |
| 2023/0385732 A1* | 11/2023 | Huo ....................... G06N 3/088 |
| 2023/0401833 A1* | 12/2023 | Guo ..................... G06F 16/532 |
| 2024/0152735 A1* | 5/2024 | Wang ................... G06N 3/0442 |
| 2024/0291864 A1* | 8/2024 | Sofer ................... H04L 63/205 |
| 2024/0323208 A1* | 9/2024 | Divakaran .......... H04L 63/1425 |
| 2024/0356945 A1* | 10/2024 | Kumar .................. G06N 20/00 |

OTHER PUBLICATIONS

De Assis, Marcos VO, et al. "Near real-time security system applied to SDN environments in IoT networks using convolutional neural network." Computers & Electrical Engineering 86 (2020): 106738. (Year: 2020).*
Skopik, Florian, et al. "Behavior-based anomaly detection in log data of physical access control systems." IEEE Transactions on Dependable and Secure Computing 20.4 (2022): pp. 3158-3175 (Year: 2022).*

* cited by examiner

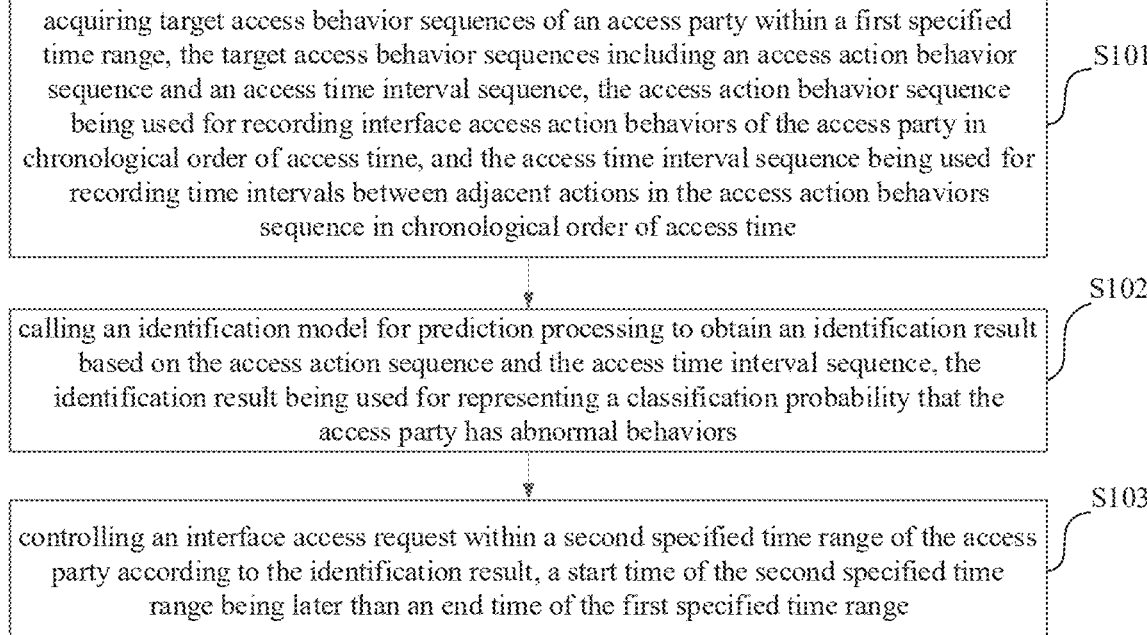

acquiring target access behavior sequences of an access party within a first specified
time range, the target access behavior sequences including an access action behavior
sequence and an access time interval sequence, the access action behavior sequence
being used for recording interface access action behaviors of the access party in
chronological order of access time, and the access time interval sequence being used for
recording time intervals between adjacent actions in the access action behaviors
sequence in chronological order of access time — S101 calling an identification model for prediction processing to obtain an identification result
based on the access action sequence and the access time interval sequence, the
identification result being used for representing a classification probability that the
access party has abnormal behaviors — S102 controlling an interface access request within a second specified time range of the access
party according to the identification result, a start time of the second specified time
range being later than an end time of the first specified time range — S103

Fig. 1

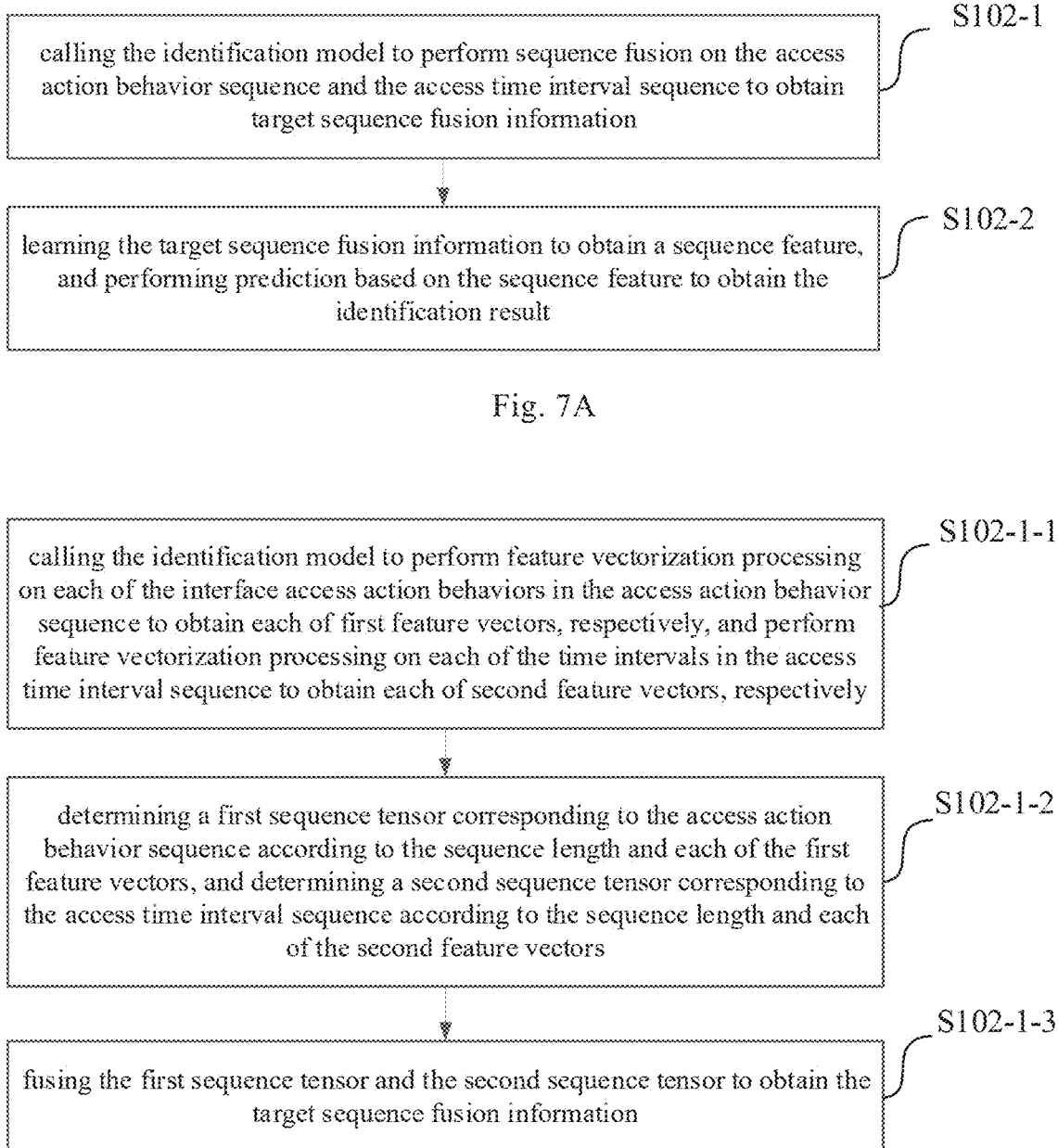

S102-1 calling the identification model to perform sequence fusion on the access action behavior sequence and the access time interval sequence to obtain target sequence fusion information

S102-2 learning the target sequence fusion information to obtain a sequence feature, and performing prediction based on the sequence feature to obtain the identification result

Fig. 7A

S102-1-1 calling the identification model to perform feature vectorization processing on each of the interface access action behaviors in the access action behavior sequence to obtain each of first feature vectors, respectively, and perform feature vectorization processing on each of the time intervals in the access time interval sequence to obtain each of second feature vectors, respectively

S102-1-2 determining a first sequence tensor corresponding to the access action behavior sequence according to the sequence length and each of the first feature vectors, and determining a second sequence tensor corresponding to the access time interval sequence according to the sequence length and each of the second feature vectors

S102-1-3 fusing the first sequence tensor and the second sequence tensor to obtain the target sequence fusion information

Fig. 7B

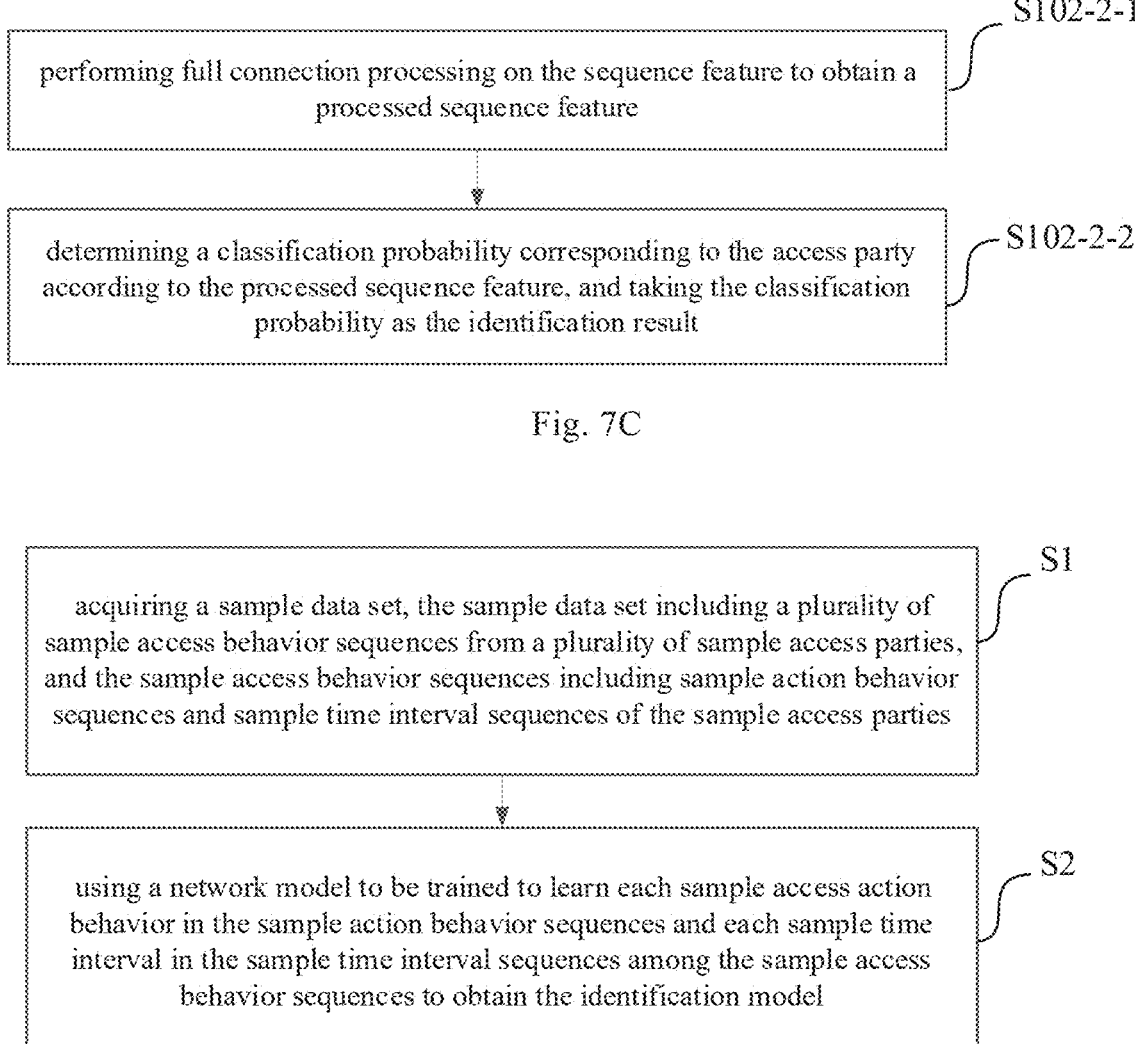

performing full connection processing on the sequence feature to obtain a processed sequence feature ⟍ S102-2-1 determining a classification probability corresponding to the access party according to the processed sequence feature, and taking the classification probability as the identification result ⟍ S102-2-2

Fig. 7C acquiring a sample data set, the sample data set including a plurality of sample access behavior sequences from a plurality of sample access parties, and the sample access behavior sequences including sample action behavior sequences and sample time interval sequences of the sample access parties ⟍ S1 using a network model to be trained to learn each sample access action behavior in the sample action behavior sequences and each sample time interval in the sample time interval sequences among the sample access behavior sequences to obtain the identification model ⟍ S2

Fig. 7D screening out first sample access behavior sequences, second sample access behavior sequences and third sample access behavior sequences from the sample data set, the first sample access behavior sequence being sample access behavior sequences within a third specified time range of a sample access party with abnormal behaviors, the second sample access behavior sequence being sample access behavior sequences of a sample access party that has no abnormal behavior and is not hit by a preset abnormality detection strategy, the third sample access behavior sequence being sample access behavior sequences within the third specified time range of a sample access party hit by the preset abnormality detection strategy, and the preset abnormality detection strategy being used for detecting whether an access action behavior of the sample access party has access risk

S2-1 using the network model to be trained to learn sample access action behaviors and sample time intervals corresponding to the first sample access behavior sequences, the second sample access behavior sequences and the third sample access behavior sequences respectively to obtain the identification model

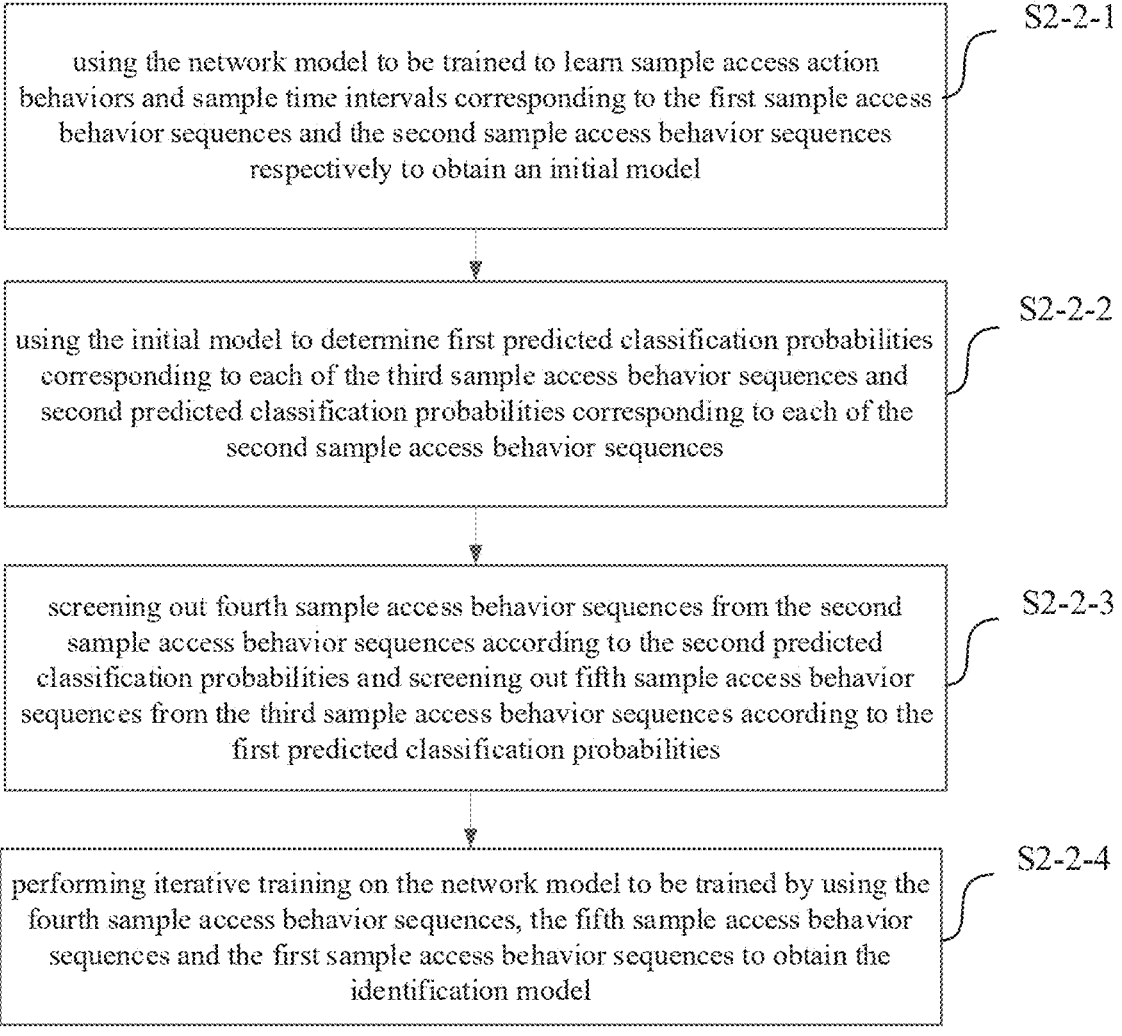

using the network model to be trained to learn sample access action behaviors and sample time intervals corresponding to the first sample access behavior sequences and the second sample access behavior sequences respectively to obtain an initial model — S2-2-1 using the initial model to determine first predicted classification probabilities corresponding to each of the third sample access behavior sequences and second predicted classification probabilities corresponding to each of the second sample access behavior sequences — S2-2-2 screening out fourth sample access behavior sequences from the second sample access behavior sequences according to the second predicted classification probabilities and screening out fifth sample access behavior sequences from the third sample access behavior sequences according to the first predicted classification probabilities — S2-2-3 performing iterative training on the network model to be trained by using the fourth sample access behavior sequences, the fifth sample access behavior sequences and the first sample access behavior sequences to obtain the identification model — S2-2-4

Fig. 7F

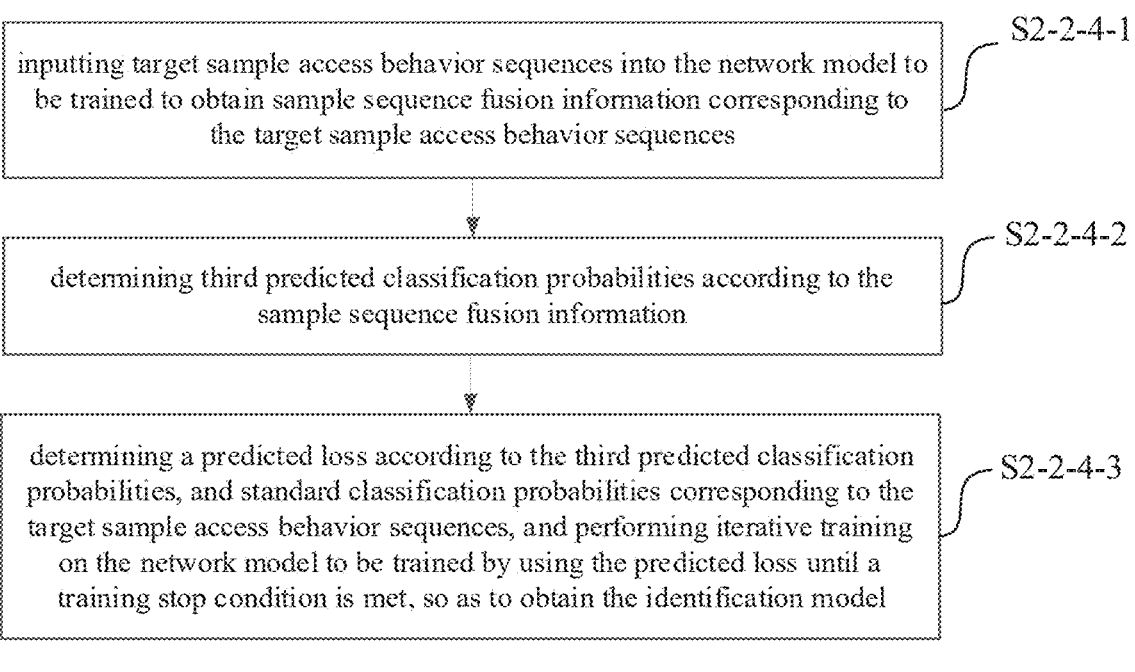

S2-2-4-1 inputting target sample access behavior sequences into the network model to be trained to obtain sample sequence fusion information corresponding to the target sample access behavior sequences

S2-2-4-2 determining third predicted classification probabilities according to the sample sequence fusion information

S2-2-4-3 determining a predicted loss according to the third predicted classification probabilities, and standard classification probabilities corresponding to the target sample access behavior sequences, and performing iterative training on the network model to be trained by using the predicted loss until a training stop condition is met, so as to obtain the identification model

Fig. 7G

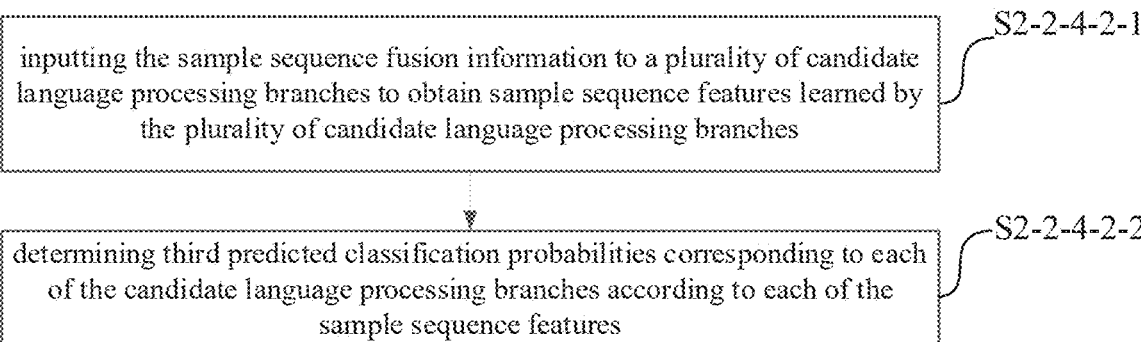

S2-2-4-2-1 inputting the sample sequence fusion information to a plurality of candidate language processing branches to obtain sample sequence features learned by the plurality of candidate language processing branches

S2-2-4-2-2 determining third predicted classification probabilities corresponding to each of the candidate language processing branches according to each of the sample sequence features

INTERFACE ACCESS PROCESSING METHOD, COMPUTER DEVICE AND STORAGE MEDIUM

CROSS-REFERENCE TO RELATED APPLICATION

The present application claims the priority to Chinese Patent Application No. 202311360337.9, filed on Oct. 19, 2023, the entire disclosure of which is incorporated herein by reference as portion of the present application.

TECHNICAL FIELD

The present disclosure relates to an interface access processing method and apparatus, a computer device and a storage medium.

BACKGROUND

In many fields such as e-commerce, transaction information systems are usually used to manage order information, which includes ordering parties, service providers, products, etc. These are critical business details, hence, technological measures are required in platform operations to control secure access to interfaces to ensure the security of order information.

SUMMARY

The embodiments of the present disclosure provide an interface access processing method and apparatus, a computer device and a storage medium.

In a first aspect, the embodiments of the present disclosure provide an interface access processing method, including:

In a possible implementation, the controlling the interface access request within the second specified time range of the access party according to the identification result includes:

in response to the classification probability in the identification result being greater than a specified threshold, intercepting the interface access request initiated by the access party within the second specified time range; or, in response to the classification probability in the identification result being not greater than the specified threshold, allowing the interface access request initiated by the access party within the second specified time range.

In a possible implementation, the calling the identification model for prediction processing to obtain the identification result based on the access action sequence and the access time interval sequence includes:

calling the identification model to perform sequence fusion on the access action behavior sequence and the access time interval sequence to obtain target sequence fusion information; and learning the target sequence fusion information to obtain a sequence feature, and performing prediction based on the sequence feature to obtain the identification result.

In a possible implementation, the learning the target sequence fusion information to obtain the sequence feature includes:

using a natural language processing branch to perform feature conversion processing and learning on the target sequence fusion information to obtain the sequence feature.

In a possible implementation, the access action behavior sequence and the access time interval sequence have a same sequence length; and the calling the identification model to perform sequence fusion on the access action behavior sequence and the access time interval sequence to obtain target sequence fusion information includes:

calling the identification model to perform feature vectorization processing on each of the interface access action behaviors in the access action behavior sequence to obtain each of first feature vectors, respectively, and perform feature vectorization processing on each of the time intervals in the access time interval sequence to obtain each of second feature vectors, respectively;

determining a first sequence tensor corresponding to the access action behavior sequence according to the sequence length and each of the first feature vectors, and determining a second sequence tensor corresponding to the access time interval sequence according to the sequence length and each of the second feature vectors; and fusing the first sequence tensor and the second sequence tensor to obtain the target sequence fusion information.

In a possible implementation, determining the identification model includes:

acquiring a sample data set, the sample data set including a plurality of sample access behavior sequences from a plurality of sample access parties, and the sample access behavior sequences including sample action behavior sequences and sample time interval sequences of the sample access parties; and using a network model to be trained to learn each sample access action behavior in the sample action behavior sequences and each sample time interval in the sample time interval sequences among the sample access behavior sequences to obtain the identification model.

In a possible implementation, the using the network model to be trained to learn each sample access action behavior in the sample action behavior sequences and each sample time interval in the sample time interval sequences among the sample access behavior sequences to obtain the identification model includes:

screening out first sample access behavior sequences, second sample access behavior sequences and third sample access behavior sequences from the sample data set, the first sample access behavior sequence being sample access behavior sequences of a sample access party with abnormal behaviors within a third specified time range, the second sample access behavior sequence being sample access behavior sequences of a sample access party that has no abnormal behavior and is not hit by a preset abnormality detection strategy, the third sample access behavior sequence being sample access behavior sequences of a sample access party hit by the preset abnormality detection strategy within the third specified time range, and the preset abnormality detection strategy being used for detecting whether an access action behavior of the sample access party has access risk; and using the network model to be trained to learn sample access action behaviors and sample time intervals corresponding to the first sample access behavior sequences, the second sample access behavior sequences and the third sample access behavior sequences respectively to obtain the identification model.

In a possible implementation, the using the network model to be trained to learn sample access action behaviors and sample time intervals corresponding to the first sample access behavior sequences, the second sample access behavior sequences and the third sample access behavior sequences respectively to obtain the identification model includes:

using the network model to be trained to learn sample access action behaviors and sample time intervals corresponding to the first sample access behavior sequences and the second sample access behavior sequences respectively to obtain an initial model;

using the initial model to determine first predicted classification probabilities corresponding to each of the third sample access behavior sequences and second predicted classification probabilities corresponding to each of the second sample access behavior sequences;

screening out fourth sample access behavior sequences from the second sample access behavior sequences according to the second predicted classification probabilities, and screening out fifth sample access behavior sequences from the third sample access behavior sequences according to the first predicted classification probabilities; and performing iterative training on the network model to be trained by using the fourth sample access behavior sequences, the fifth sample access behavior sequences and the first sample access behavior sequences to obtain the identification model.

In a possible implementation, the performing iterative training on the network model to be trained by using the fourth sample access behavior sequences, the fifth sample access behavior sequences and the first sample access behavior sequences to obtain the identification model includes:

inputting target sample access behavior sequences into the network model to be trained to obtain sample sequence fusion information corresponding to the target sample access behavior sequences, the target sample access behavior sequence being one selected from a group consisting of the fourth sample access behavior sequence, the fifth sample access behavior sequence and the first sample access behavior sequence;

determining third predicted classification probabilities according to the sample sequence fusion information; and determining a predicted loss according to the third predicted classification probabilities and standard classification probabilities corresponding to the target sample access behavior sequences, and performing iterative training on the network model to be trained by using the predicted loss until a training stop condition is met, so as to obtain the identification model.

In a possible implementation, the determining third predicted classification probabilities according to the sample sequence fusion information includes:

inputting the sample sequence fusion information to a plurality of candidate language processing branches to obtain sample sequence features learned by the plurality of candidate language processing branches; and determining third predicted classification probabilities corresponding to each of the candidate language processing branches according to each of the sample sequence features; and determining the predicted loss according to the third predicted classification probabilities and standard classification probabilities corresponding to the target sample access behavior sequences includes:

screening out a target language processing branch from the plurality of candidate language processing branches according to each of the third predicted classification probabilities and the standard classification probabilities; and determining the predicted loss according to a fourth predicted classification probability corresponding to the target language processing branch and the standard classification probabilities.

In a possible implementation, the screening out first sample access behavior sequences, second sample access behavior sequences and third sample access behavior sequences from the sample data set includes:

screening out each of the first sample access behavior sequences, the second sample access behavior sequences and the third sample access behavior sequences from the sample data set by using preset sample screening rules and sequence features corresponding to each sample access behavior sequence, the preset sample screening rules including that a sequence length of the sample access behavior sequence within a third preset time range is greater than a preset length, and/or that data interfaces related to the sample access behavior sequences include target data interfaces and a number of sample access action behaviors related to the target data interfaces in the sample access behavior sequences is greater than a preset number.

In a second aspect, the embodiments of the present disclosure provide an interface access processing apparatus, including:

an acquisition module, configured to acquire target access behavior sequences of an access party within a first specified time range, the target access behavior sequences including an access action behavior sequence and an access time interval sequence, the access action behavior sequence being used for recording interface access action behaviors of the access party in chronological order of access time, and the access time interval sequence being used for recording time intervals between adjacent actions in the access action behaviors sequence in chronological order of access time;

a determination module, configured to call an identification model for prediction processing to obtain an identification result based on the access action sequence and the access time interval sequence, the identification result being used for representing a classification probability that the access party has abnormal behaviors; and a processing module, configured to control an interface access request within a second specified time range of the access party according to the identification result, a start time of the second specified time range being later than an end time of the first specified time range.

In a third aspect, the optional implementation of the present disclosure further provides a computer device, including a processor and a memory, in which the memory stores machine-readable instructions executable by the processor, the processor is used for executing the machine-readable instructions stored in the memory, and when the machine-readable instructions are executed by the processor, the processor executes the steps in the above-mentioned first aspect, or any possible implementation of the first aspect.

In a fourth aspect, the optional implementation of the present disclosure further provides a non-transitory computer-readable storage medium, in which a computer program is stored on the computer-readable storage medium, and when the computer program is run on a computer device, the computer device executes the steps in the above-mentioned first aspect, or any possible implementation of the first aspect.

BRIEF DESCRIPTION OF DRAWINGS

In order to more clearly illustrate the technical solutions in the embodiments of the present disclosure or in related art, the drawings to be used in the description of the embodiments or prior art will be briefly described below. Obviously, the drawings in the following description are only some embodiments recorded in the present disclosure. For those ordinarily skilled in the art, other drawings may be obtained based on these drawings without inventive work.

FIG. 1 is a flowchart of an interface access processing method according to an embodiment of the present disclosure;

FIG. 7A is a flowchart of specific implementation of step S102 shown in FIG. 1.

FIG. 7B is a flowchart of specific implementation of step S102-1 shown in FIG. 7A.

FIG. 7C is a flowchart of specific implementation of step S102-2 shown in FIG. 7A.

FIG. 7D is a flowchart of an identification model training method according to an embodiment of the present disclosure.

FIG. 7E is a flowchart of specific implementation of step S2 shown in FIG. 7D.

FIG. 7F is a flowchart of specific implementation of step S2-2 shown in FIG. 7E.

FIG. 7G is a flowchart of specific implementation of step S2-2-4 shown in FIG. 7F.

FIG. 7H is a flowchart of specific implementation of step S2-2-4-2 shown in FIG. 7G.

DETAILED DESCRIPTION

Figure 2:
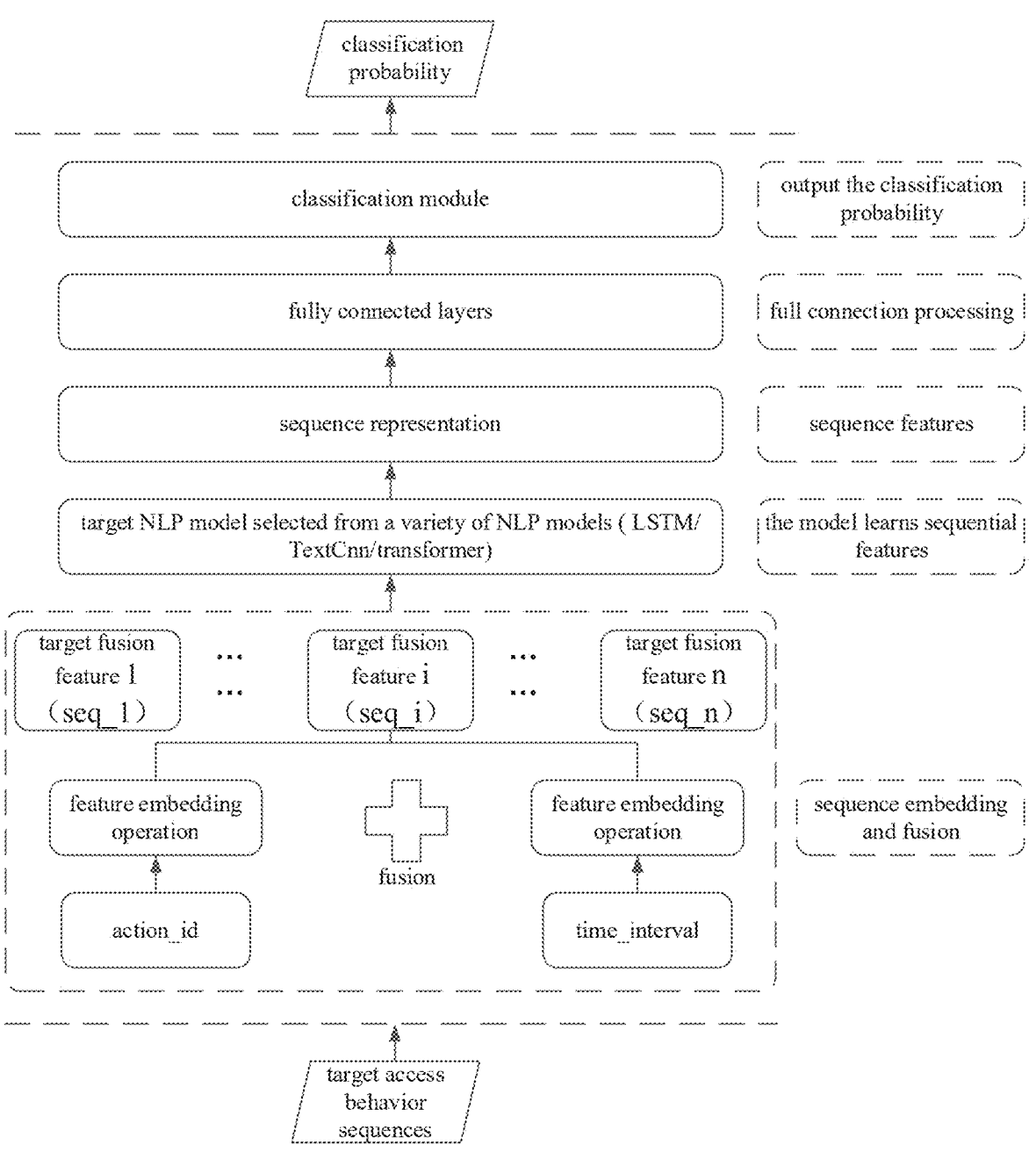
FIG. 2 is a structural diagram of an identification model according to an embodiment of the present disclosure.

In order to make the objectives, technical solutions, and advantages of the embodiments of the present disclosure clearer, the technical solutions in the embodiments of the present disclosure will be described clearly and completely below in conjunction with the drawings. Apparently, the described embodiments are just a part but not all of the embodiments of the present disclosure. All other embodiments obtained by those ordinary skilled in the art without any creative effort based on the embodiments of the present disclosure fall within the scope of the present disclosure.

It should be noted that the user information (including but not limited to user equipment information, user personal information, etc.) and data (including but not limited to data for analysis, storage, display, etc.) involved in the present disclosure are all information and data authorized by users or duly authorized by all parties concerned, the collection, use and processing of relevant data need to comply with relevant laws, regulations and standards of relevant countries and regions, and corresponding operation portals are provided for users to select either granting or denying authorization.

The terms such as "first" and "second" in the description, claims or above-mentioned drawings in the embodiments of the present disclosure are intended to distinguish between similar objects and are not necessarily to describe a specific order or sequence. It should be understood that the terms used in this way are interchangeable under appropriate circumstances, so that the embodiments described herein can be implemented in other orders than those illustrated or described herein.

As used herein, "a plurality of or several" refers to two or more. The term "and/or" herein signifies an association relationship between associated objects, denoting the possibility of three different relationship types. For example, A and/or B may mean A alone; A and B; and B alone. The character "/" generally indicates that the associated objects have an "or" relationship.

It is found through research that common information leakage prevention solutions typically involve manually mining the features of interface access behaviors (such as manually mining statistical features) and utilizing the manually mined features to build machine learning models. However, traditional machine learning models tend to exhibit a noticeable decrease in effectiveness after a period of combating unauthorized information access. This is because unauthorized information acquisition parties gradually learn the adversarial rules of the machine learning model during the process of confrontation, thereby attempting to simulate normal information access behaviors to bypass the model. Once this situation arises, it requires manual re-mining of features and retraining of the model, consuming a significant amount of time. This leads to the problem of long model iteration cycles, and as the random confrontation continues, the camouflage tactics used by unauthorized information acquisition parties (i.e., unauthorized access parties) will become increasingly sophisticated, making manual feature mining more difficult and critical features harder to extract. Therefore, traditional methods of using machine learning models for interface access interception suffer from low interception accuracy, high manual costs, and long iteration cycles, which impact the effectiveness of intercepting interface access behaviors and information security. While there are now some end-to-end deep learning models that can address the issue of high manual costs, these models are susceptible to the influence of sample quantity and noise in various types of samples, leading to problems of poor identification accuracy and interception efficacy.

Based on the above research, the present disclosure provides an interface access processing method and apparatus, a computer device and a storage medium. An identification model is used to identify a plurality of interface access action behaviors in an access action behavior sequence and each time interval in an access time interval sequence, and based on information contained in a data interface itself and time information, behavior features and laws characterizing the behavior of accessing the data interface by an access party can be accurately identified. According to the identified information, whether the access party has abnormal behaviors can be accurately determined, that is, an identification result for characterizing a classification probability is accurately determined. After that, according to the identification result, an interface access request of the access party in a second specified time range in the future can be accurately processed (for example, accurately intercepted), so as to avoid unauthorized access to the data interface by the access party, thus reducing information leakage and improving the security of information and data interface access. Moreover, because the identification model may be an end-to-end active learning model which can be trained without the need for manual feature mining, the model training cost is effectively reduced.

Further, the interface access processing method and apparatus, computer device and storage medium provided in the embodiments of the present disclosure can also first train an initial model by using the first sample access behavior sequences and the second sample access behavior sequences, and then use the initial model to screen the third sample access behavior sequences and the second sample access behavior sequences. This can effectively eliminate the noise samples in the third sample access behavior sequences and the second sample access behavior sequences, thereby solving the problems of excessive noise in black-and-white samples, unbalanced number of black-and-white samples, and difficulties in manual sample annotation, and improving the model learning effect and training efficiency.

The defects identified in the above schemes are the results of the inventors' practice and careful study. Therefore, the discovery process of the above problems and the solutions proposed in the present disclosure should all be considered as the contributions made by the inventors in the present disclosure process.

It should be noted that similar reference numerals and letters indicate similar items in the following figures, so once an item is defined in one figure, it will not be further defined and explained in subsequent figures.

It can be understood that before using the technical schemes disclosed in several embodiments of the present disclosure, access parties should be informed of the types, scope of use and usage scenarios of personal information involved in the present disclosure in an appropriate way in accordance with relevant laws and regulations, and access party authorization is required.

To facilitate the understanding of the embodiments, firstly, an interface access processing method disclosed in an embodiment of the present disclosure is introduced in detail. The executive subject of the interface access processing method provided in this embodiment of the present disclosure is generally a terminal device with certain computing power or other processing devices, and the terminal device may be user equipment (UE), a mobile device, an access party terminal, a terminal, a personal digital assistant (PDA), a handheld device, a computer device, etc. In some possible implementation modes, the interface access processing method may be realized by a processor invoking computer-readable instructions stored in a memory.

Next, the interface access processing method provided by the embodiment of the present disclosure will be explained by taking a computer device as the executive subject.

As shown in FIG. 1 which is a flowchart of an interface access processing method according to an embodiment of the present disclosure, the method may include the following steps.

In S101, acquiring target access behavior sequences of an access party within a first specified time range, the target access behavior sequences including an access action behavior sequence and an access time interval sequence, the access action behavior sequence being used for recording interface access action behaviors of the access party in chronological order of access time, and the access time interval sequence being used for recording time intervals between adjacent actions in the access action behaviors sequence in chronological order of access time.

Here, the access party may be a party accessing a data interface, for example, the access party may be a merchant in the field of e-commerce, and the data interface may be an interface for acquiring any data information, for example, the data interface may be an order information acquisition interface in the field of e-commerce.

A time length of the first specified time range may be set according to experience, which is not limited by the embodiment of the present disclosure. For example, the first specified time range may be the past X hours, a certain time period in the past, and so on.

The target access behavior sequences are to record the behavior sequences related to the action behavior of accessing the data interface by the access party, which may include an access action behavior sequence and an access time interval sequence. The access action behavior sequence may include a plurality of interface access action behaviors of the access party recorded in chronological order of access time, which may be interface access action behaviors of the same access party within the first specified time range. For example, a plurality of interface access action behaviors corresponding to an access action behavior sequence may be interface access action behaviors generated by an access party A in the past hour, or interface access action behaviors generated by the access party A within a certain hour x (x is an integer greater than or equal to 0) days ago. The interface access action behavior is the action behavior of accessing the data interface, one interface access action behavior corresponds to one access interface, and a plurality of interface access action behaviors corresponding to one access action behavior sequence may be action behaviors of accessing the same data interface or action behaviors of accessing different data interfaces. The plurality of interface access action behaviors recorded in the access action behavior sequence may be specifically action identity documents (id) used for uniquely characterizing the interface access action behaviors.

The access time interval sequence may include time intervals between every two adjacent interface access action behaviors among the plurality of interface access action behaviors included in the access action behavior sequence, generally in seconds or milliseconds. Specifically, when an access action sequence corresponds to n interface access action behaviors, n−1 intervals usually exist. In order to ensure that the number of time intervals in the access time interval sequence is the same as the number of interface access action behaviors, that is, to ensure that the access action behavior sequence and the access time interval sequence have the same sequence length, an initial time interval 0 may be initialized as a time interval corresponding to a first interface access action behavior among the plurality of interface access action behaviors.

For example, the access action behavior sequence may be [a1, a2, a3, . . . , an], where each element is the action identification of each interface access action behavior; and the access time interval sequence may be [b1, b2, b3, . . . , bn], where each element is the time interval between two adjacent interface access action behaviors, b1 may be 0, b2 represents the time interval between two interface access action behaviors corresponding to a2 and a1, b3 represents the time interval between two interface access action behaviors corresponding to a3 and a2, and bn represents the time interval between two interface access action behaviors corresponding to an and an −1.

In concrete implementation, according to access traffic data of each data interface corresponding to an e-commerce platform, a plurality of interface access action behaviors of any access party (for example, any merchant or other authorized access party) for accessing data interfaces within a first specified time range may be acquired, and an access action behavior sequence and an access time interval sequence may be obtained according to the action identification of each interface access action behavior and the time intervals between every two adjacent interface access action behaviors.

In S102, calling an identification model for prediction processing to obtain an identification result based on the access action sequence and the access time interval sequence, the identification result being used for representing a classification probability that the access party has abnormal behaviors.

Here, the abnormal behavior may be an action behavior of acquiring data information provided at the data interface without permission, and the identification result is used for indicating whether there is an abnormal interface access action behavior among the plurality of interface access action behaviors included in the access action behavior sequence, that is, it can indicate whether the access party has an abnormal behavior and whether the access party is an abnormal access party.

The identification model may be a neural network model based on active learning and behavior sequence modeling, which may be used for identifying the access action behavior sequence and the access time interval sequence and outputting the identification result. The identification result may specifically be a classification probability, which is used for indicating the probability of abnormal behaviors of the access party. According to the classification probability, whether the access party has abnormal behaviors may be determined.

In concrete implementation, after obtaining the access action behavior sequence and the access time interval sequence corresponding to the access party, the identification model may be called, and the access action behavior sequence and the access time interval sequence are input into the identification model to obtain the identification result output by the model.

In one embodiment, as shown in FIG. 7A, S102 may be implemented according to the following steps.

In S102-1, calling the identification model to perform sequence fusion on the access action behavior sequence and the access time interval sequence to obtain target sequence fusion information.

Here, the target sequence fusion information is the information obtained by fusing the access action behavior sequence and the access time interval sequence, which may include a plurality of target fusion features related to interfaces and time, and the target fusion features may be determined based on data interfaces accessed by the interface access action behaviors in the access action behavior sequence and the time intervals corresponding to the interface access action behaviors.

In concrete implementation, the identification model may be called to perform information fusion on interface information of a data interface accessed by the interface access action behavior corresponding to each action identification in the access action behavior sequence and the time interval corresponding to the interface access action behavior, so as to obtain a target fusion feature corresponding to the interface access action behavior. In this way, based on the interface information of the data interface accessed by the interface access action behavior corresponding to each action identification and the time interval corresponding to each interface access action behavior, the target fusion features related to each interface access action behavior may be obtained, that is, the target sequence fusion information is obtained.

In one embodiment, the access action behavior sequence and the access time interval sequence may have the same sequence length, that is, the number of action identifications included in the access action behavior sequence and the number of time intervals included in the access time interval sequence may be the same. In this case, as shown in FIG. 7B, the above S102-1 may be implemented according to the following steps.

In S102-1-1, calling the identification model to perform feature vectorization processing on each of the interface access action behaviors in the access action behavior sequence to obtain each of first feature vectors, respectively, and perform feature vectorization processing on each of the time intervals in the access time interval sequence to obtain each of second feature vectors, respectively.

Here, each interface access action behavior in the access action behavior sequence may specifically be the action identification of each interface access action behavior, and the feature vectorization processing is feature embedding for the action identification. Specifically, a first dimension number after vectorization of the action identification and a second dimension number after vectorization of the time interval may be specified in advance. A first feature vector with the first dimension number may be obtained after the feature vectorization processing of the action identification, and a second feature vector with the second dimension number may be obtained after the feature vectorization processing of the time interval.

Suppose the first dimension number is m1 and the second dimension number is m2, in concrete implementation, for each interface access action behavior in the access action behavior sequence, the identification model may be used to perform embedding on each action identification to obtain the first feature vectors in m1 dimensions. At the same time, embedding may be performed on each time interval in the access time interval sequence to obtain the second feature vectors in m2 dimensions.

In S102-1-2, determining a first sequence tensor corresponding to the access action behavior sequence according to the sequence length and each of the first feature vectors, and determining a second sequence tensor corresponding to the access time interval sequence according to the sequence length and each of the second feature vectors.

Here, the first feature vector and the second feature vector may be regarded as one-dimensional arrays, and the first sequence tensor and the second sequence tensor are two-dimensional arrays obtained by dimension expansion of the one-dimensional arrays. The first sequence tensor is a tensor obtained by dimension expansion of the first feature vectors, and the second sequence tensor is a tensor obtained by dimension expansion of the second feature vectors.

Suppose the sequence length is n, the first feature vector is an m1-dimensional vector and the second feature vector is an m2-dimensional vector, the first sequence tensor (n, m1) can be obtained according to the sequence length and the first feature vectors, where n means that there are n first feature vectors, and m1 represents different first feature vectors; meanwhile, the second sequence tensor (n, m2) can be obtained according to the sequence length and the second feature vectors, where n means that there are n second feature vectors, and m2 represents different second feature vectors.

In S102-1-3, fusing the first sequence tensor and the second sequence tensor to obtain the target sequence fusion information.

In concrete implementation, after the first sequence tensor and the second sequence tensor are obtained, a first feature vector and a second feature vector at corresponding positions may be spliced and fused to obtain one target fusion feature on the premise that the number of vectors in the tensor remains unchanged. For example, after fusing the first sequence tensor (n, m1) and the second sequence tensor (n, m2), the obtained target sequence fusion information is still one tensor, which may specifically be (n, m1+m2). For example, one first feature vector in the first sequence tensor and one second feature vector in the second sequence tensor may be fused to obtain one target fusion feature.

For better understanding, suppose the sequence length is 10, the first dimension number is 20, the second dimension number is 10, the access action behavior sequence is [a1, a2, a3, . . . , an], and the access time interval sequence is [b1, b2, b3, . . . , bn], then 10 20-dimensional first feature vectors may be obtained after performing embedding on each element in the access action behavior sequence; further, the first sequence tensor obtained according to the sequence length may be (10, 20), that is, the first sequence tensor represents a 10×20-dimensional vector; similarly, 10 10-dimensional second feature vectors may be obtained after performing embedding on each element in the access time interval sequence, and the second sequence tensor obtained according to the sequence length may be (10, 10), that is, the first sequence tensor represents a 10×10-dimensional vector; and then, the first sequence tensor (10, 20) and the second sequence tensor (10, 10) may be fused into (10, 30) target sequence fusion information, which represents a 10×30-dimensional vector.

It should be noted that when the identification model is obtained by training, if the number of batch data selected for training is q (positive integer greater than or equal to 1), that is, the number of samples that the model can learn at one time is q, then the tensor of each batch during training is (q, n, m1+m2), that is, q access action behavior sequences and q access time interval sequences are used.

In S102-2, learning the target sequence fusion information to obtain a sequence feature, and performing prediction based on the sequence feature to obtain the identification result.

Here, the sequence feature is used for uniformly characterizing the access action behavior sequence and the access time interval sequence, enabling the fusion of interface information and time information. The sequence feature may be a unified characterization vector corresponding to the target sequence fusion information, which is used for characterizing a feature learned from the target sequence fusion information.

For example, after obtaining the target sequence fusion information, the identification model may perform one or more times of convolution processing, one or more times of full connection processing, or one or more times of feature normalization processing on each target fusion feature in the target sequence fusion information, so as to obtain the sequence feature corresponding to the target sequence fusion information through learning. Then, the identification model performs prediction based on the learned sequence feature to obtain the identification result for the target access behavior sequences. For example, the identification result may be a classification probability used for characterizing the presence of abnormal behaviors of the access party.

In one embodiment, "learning the target sequence fusion information to obtain a sequence feature" in the above step S102-2 may be implemented according to the following steps:

using a natural language processing branch to perform feature conversion processing and learning on the target sequence fusion information to obtain the sequence feature.

Here, the target sequence fusion information may include a plurality of target fusion features, and one target fusion feature may correspond to one sequence feature. The natural language processing (NLP) branch may be a target NLP model selected from a variety of preset NLP models when training the identification model, and the variety of preset NLP models may include, for example, LSTM model, TextCnn model, transformer model, etc.

In concrete implementation, the target sequence fusion information may be input to the NLP branch, the features in the target sequence fusion information may be learned by the NLP branch, and each target fusion feature may be subjected to feature conversion processing and learning, so as to obtain the sequence features corresponding to each target fusion feature, that is, the unified characterization vectors corresponding to each target fusion feature may be obtained. Then, the sequence features corresponding to each target fusion feature may be used as the sequence features corresponding to the target sequence fusion information. Alternatively, the sequence features corresponding to each target fusion feature may be spliced to obtain one sequence feature corresponding to the target sequence fusion information.

In one implementation mode, as shown in FIG. 7C, "learning the target sequence fusion information to obtain a sequence feature" in the above step S102-2 may be implemented according to the following steps.

In S102-2-1, performing full connection processing on the sequence feature to obtain a processed sequence feature.

In concrete implementation, one or more fully connected (FC) layers in the identification model may be used for performing full connection processing on the sequence feature to obtain a processed sequence feature.

Meanwhile, when training the identification model, it is possible to intervene in feature processing using the FC layers to prevent overfitting problems.

In S102-2-2, determining a classification probability corresponding to the access party according to the processed sequence feature, and taking the classification probability as the identification result.

Here, the classification probability is used for characterizing the probability of abnormal behaviors in the interface access action behaviors included in the access action behavior sequence, and it may also characterize the probability that the access party is an abnormal access party.

In concrete implementation, after the processed sequence feature is obtained, a classification module in the identification model may be used to output a classification probability according to the processed sequence feature, and the classification probability is taken as the identification result.

As shown in FIG. 2 which is a structural diagram of an identification model according to an embodiment of the present disclosure, input information may be target access behavior sequences which include an access action behavior sequence and an access time interval sequence, the access action behavior sequence includes action identifications (action_id) of a plurality of interface access action behaviors recorded in chronological order of access time, and the access time interval sequence includes time intervals (time_interval) between adjacent interface access action behaviors in the access action behavior sequence recorded in chronological order of access time. The identification model may perform feature embedding operation on each action_id and each time_interval, and fuse each of first feature vectors and each of second feature vectors obtained from the feature embedding, so as to obtain target fusion features 1 (seq_1)-n (that is, seq_1-seq_n), where n is equal to the sequence length, and i is a number between 0 and n. Here, the target fusion features may form target sequence fusion information. After that, a target NLP model selected from a variety of NLP models (such as LSTM/TextCnn/transformer in FIG. 2) may be used to perform sequence feature learning on each target fusion feature to obtain a sequence feature. Then, fully connected (FC) layers may be used for full connection processing, and then a classification module may be used for classification processing, thus outputting a classification probability. For the specific implementation process of each part shown in FIG. 2, please refer to the above embodiments, which will not be repeated here.

In S103, controlling an interface access request within a second specified time range of the access party according to the identification result, a start time of the second specified time range being later than an end time of the first specified time range.

Here, a time length of the second specified time range may be set according to experience, which is not limited by the embodiment of the present disclosure. The interface access request is a request by the access party to access any data interface. The second specified time range may also be determined according to the identification result. For example, in response to the identification result indicating that the access party has abnormal behaviors, the second specified time range may be specified time range 1, and in response to the identification result indicating that there is no abnormal behavior of the access party, the second specified time range may be specified time range 2. A time length of the specified time range 2 may be smaller than that of the specified time range 1. The processing methods for the interface access request vary depending on different identification results.

In concrete implementation, after the identification result is obtained, the classification probability in the identification result may be compared with a specified threshold. The specified threshold may be set according to experience, which is not limited by the embodiment of the present disclosure. The classification probability being greater than the specified threshold may indicate that the access party has abnormal behaviors, otherwise it can be determined that the access party does not have abnormal behaviors. The classification probability in the identification result being greater than the specified threshold may indicate that the access party has abnormal behaviors, and the interface access request initiated by the access party within the second specified time range is intercepted. Or, the classification probability in the identification result being less than or equal to the specified threshold may indicate that there is no abnormal behavior of the access party, and a normal response is made to each interface access request initiated by the access party within the second specified time range.

Figure 3:
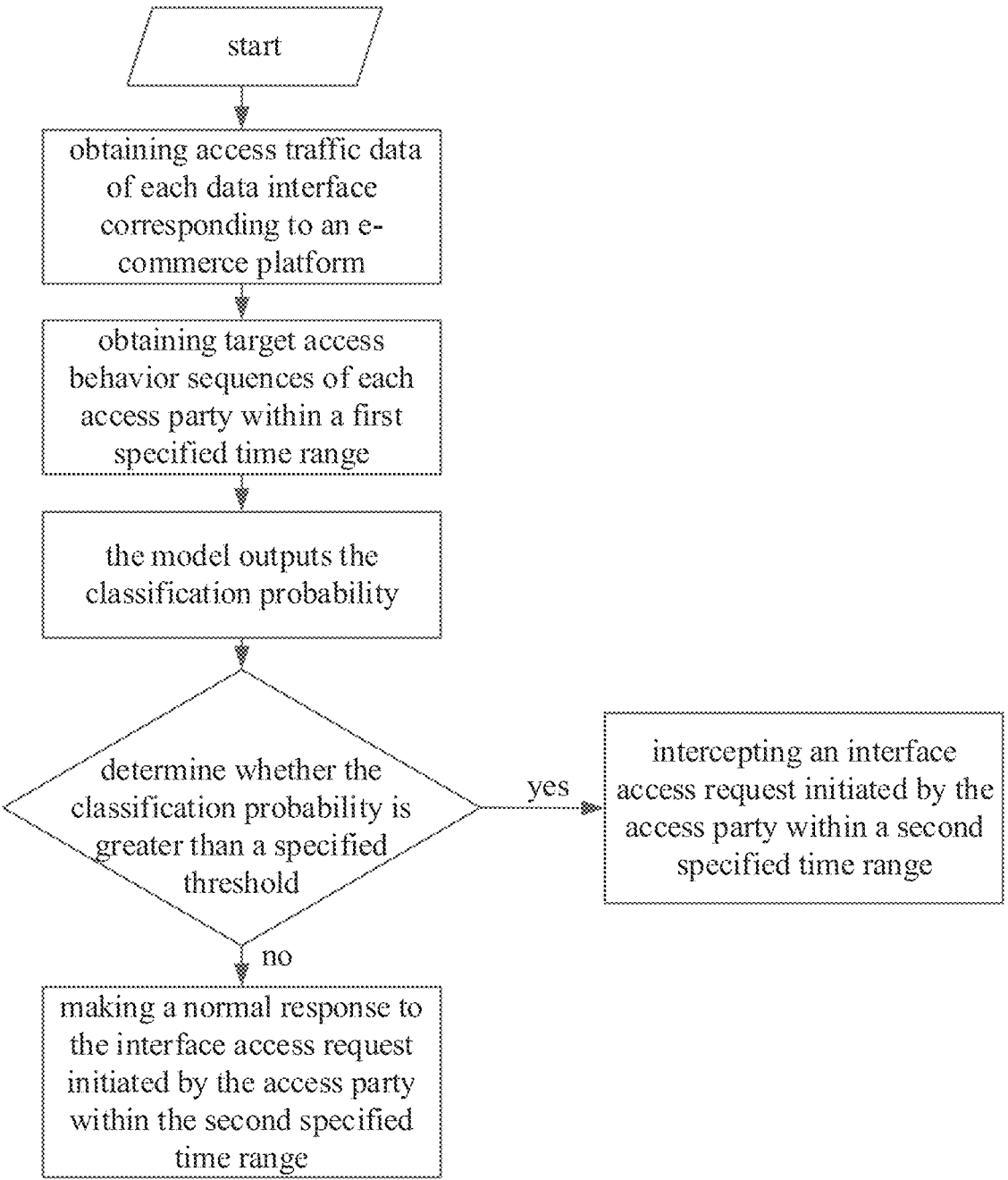
FIG. 3 is a schematic diagram of a specific implementation process of an interface access processing method according to an embodiment of the present disclosure.

As shown in FIG. 3 which is a schematic diagram of a specific implementation process of an interface access processing method according to an embodiment of the present disclosure, specifically, after obtaining access traffic data of each data interface corresponding to an e-commerce platform, target access behavior sequences of each access party within a first specified time range may be obtained. Then, for each access party, the target access behavior sequences of the access party may be input into an identification model for model prediction, so as to obtain a classification probability. After that, whether the classification probability is greater than a specified threshold may be determined; if so, an interface access request initiated by the access party within a second specified time range may be intercepted; if not, a normal response may be made to the interface access request initiated by the access party within the second specified time range, that is, normal access is allowed for the access party.

According to the above embodiments, an identification model is used to identify a plurality of interface access action behaviors in an access action behavior sequence and each time interval in an access time interval sequence, and based on information contained in a data interface itself and time information, behavior features and laws characterizing the behavior of accessing the data interface by an access party can be accurately identified. According to the identified information, whether the access party has abnormal behaviors can be accurately determined, that is, an identification result for characterizing a classification probability is accurately determined. After that, according to the identification result, an interface access request of the access party in a second specified time range in the future can be accurately processed (for example, accurately intercepted), so as to avoid unauthorized access to the data interface by the access party, thus reducing information leakage and improving the security of information and data interface access. Moreover, because the identification model may be an end-to-end active learning model which can be trained without the need for manual feature mining, the model training cost is effectively reduced.

As can be seen from the above embodiments, the present disclosure provides an identification model, and accordingly, an embodiment of the present disclosure may also provide a model training method, so as to obtain a trained identification model. Specifically, as shown in FIG. 7D, the identification model may be trained according to the following steps S1 and S2.

In S1, acquiring a sample data set, the sample data set including a plurality of sample access behavior sequences from a plurality of sample access parties, and the sample access behavior sequences including sample action behavior sequences and sample time interval sequences of the sample access parties.

Here, the sample access party may be a party accessing any data interface, and the sample data set may include sample access behavior sequences from a plurality of sample access parties, which may include sample access action sequences and sample time interval sequences of the sample access parties. Sequence lengths of the sample access action sequences included in different sample access behavior sequences may be different, and sequence lengths of the sample access action sequence and the sample time interval sequence included in the same sample access behavior sequence are the same. The sample access action sequence includes each sample access action behavior of the sample access party recorded in chronological order of access time, and the sample time interval sequence includes sample time intervals between adjacent sample access action behaviors recorded in chronological order of access time. Specifically, one sample access action behavior in the sample access action sequence may correspond to a sample time interval in the sample time interval sequence.

For example, according to access traffic data of each data interface corresponding to an e-commerce platform, each interface access action behavior of a plurality of sample access parties may be acquired, and then a plurality of sample access behavior sequences of the plurality of sample access parties may be obtained according to action identifications of each interface access action behavior and time intervals between every two adjacent interface access action behaviors, so that a sample data set is obtained.

In S2, using a network model to be trained to learn each sample access action behavior in the sample action behavior sequences and each sample time interval in the sample time interval sequences among the sample access behavior sequences to obtain the identification model.

Here, the sample access behavior sequences include the action behavior sequences and the time interval sequences of the sample access parties, which may be considered as a data sample from a sample access end. The network model to be trained may be considered as a model end. The network model to be trained is the original network model built according to the model framework shown in FIG. 2.

Besides the access action information, each sample access action behavior included in the sample action behavior sequence may also correspond to the interface information of the accessed data interface, and the sample time interval sequence may reflect the time information when the interface is accessed.

In concrete implementation, each sample action behavior sequence in the sample data set may be used as a learning sample, and the network model to be trained may be used to perform feature learning on the access action information and interface information corresponding to each sample access action behavior included in the sample action behavior sequence and the time information of each sample time interval included in the sample time interval sequence, so that features integrating the access action information, the interface information and the time information can be learned without manual mining of the features of the learning samples, and then the identification model is obtained.

Figure 7E:
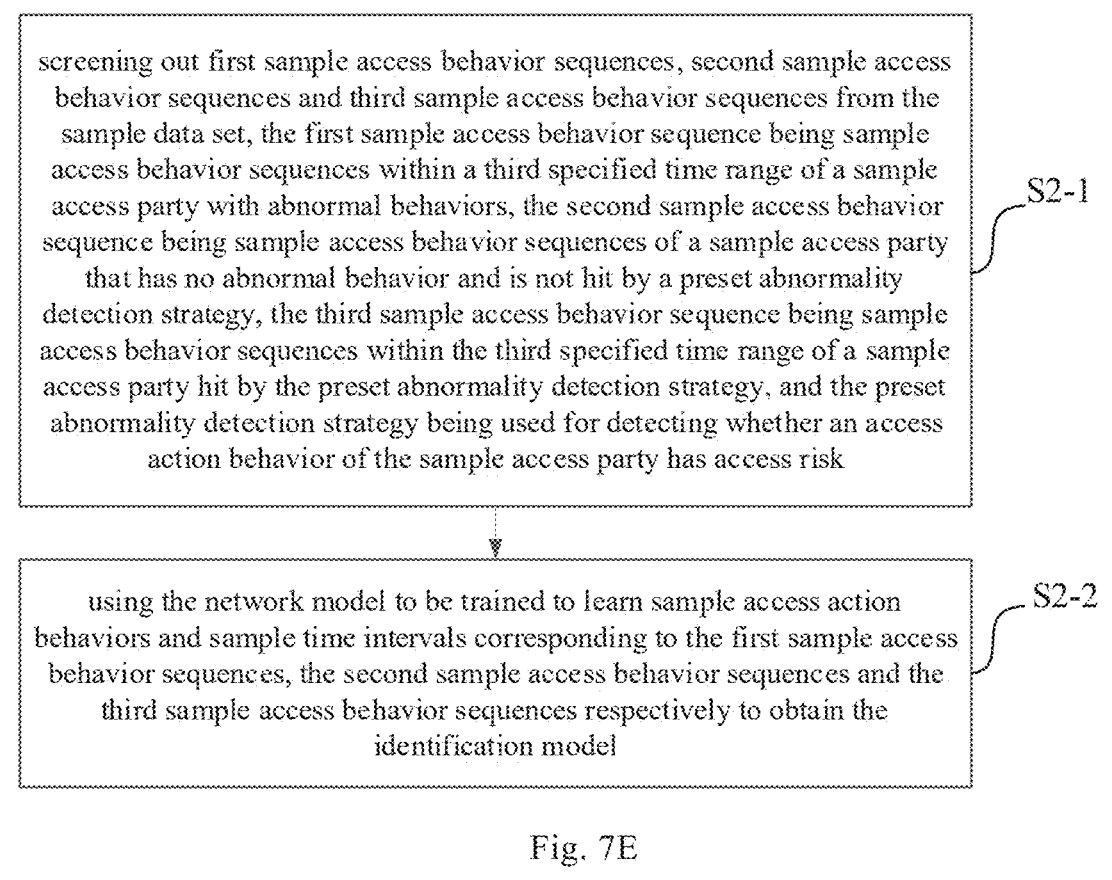

In one embodiment, as shown in FIG. 7E, S2 may be implemented according to the following steps.

In S2-1, screening out first sample access behavior sequences, second sample access behavior sequences and third sample access behavior sequences from the sample data set, the first sample access behavior sequence being sample access behavior sequences within a third specified time range of a sample access party with abnormal behaviors, the second sample access behavior sequence being sample access behavior sequences of a sample access party that has no abnormal behavior and is not hit by a preset abnormality detection strategy, the third sample access behavior sequence being sample access behavior sequences within the third specified time range of a sample access party hit by the preset abnormality detection strategy, and the preset abnormality detection strategy being used for detecting whether an access action behavior of the sample access party has access risk.

Here, a time length of the third specified time range may be the same as or different from that of the first specified time range, which is not limited by the embodiment of the present disclosure. For example, the time length of the third specified time range may be greater than or equal to the time length of the first specified time range.

The sample data set may include sample access behavior sequences corresponding to various time ranges, and may also include different types of sample access behavior sequences. Therefore, in order to ensure the identification effect of the identification model, the first sample access behavior sequences, the second sample access behavior sequences and the third sample access behavior sequences may be screened out. The second sample access behavior sequence may be a white sample, that is, a negative sample. The first sample access behavior sequence and the third sample access behavior sequence may be black samples, that is, positive samples. The first sample access behavior sequence may be a sample access behavior sequence corresponding to a first sample access party determined to have abnormal behaviors, and the sample access behavior sequence may include the sample access behavior sequence of the first sample access party within the third specified time range. For example, the first sample access behavior sequence may be a sample access behavior sequence of a sample access party who actively feeds back to the e-commerce platform that important information is acquired by an unauthorized information acquisition party.

The second sample access behavior sequence may be a sample access behavior sequence of a second sample access party within the third specified time range, and the second sample access party is a sample access party that has no abnormal behavior and is not hit by any preset abnormality detection strategy. The third sample access behavior sequence is a sample access behavior sequence within the third specified time range of a third sample access party hit by any preset abnormality detection strategy. The preset abnormality detection strategy may be one or more preset detection strategies, which are used for detecting sample access action behaviors of sample access parties towards data interfaces and determining whether there is any abnormality in the sample access action behaviors. However, due to the poor detection accuracy of the abnormality detection strategy, there may be some noise samples in the second sample access behavior sequences and the third sample access behavior sequences.

In concrete implementation, the first sample access party, the second sample access party and the third sample access party may be determined from various sample access parties based on the feedback of each sample access party in the sample data set and the preset abnormality detection strategy, so as to screen out each first sample access behavior sequence, each second sample access behavior sequence and each third sample access behavior sequence from the sample data set.

In one embodiment, S2-1 may be implemented according to the following steps:

screening out each of the first sample access behavior sequences, the second sample access behavior sequences and the third sample access behavior sequences from the sample data set by using preset sample screening rules and sequence features corresponding to each sample access behavior sequence.

Here, the preset sample screening rules are used for screening out sample access behavior sequences that meet preset conditions. For example, the preset sample screening rules may be that a sequence length of the sample access behavior sequence within a third preset time range is greater than a preset length (that is, a sequence length of the sample action behavior sequence in the sample access behavior sequences is greater than the preset length), and/or that data interfaces related to the sample access behavior sequences include target data interfaces and the number of sample access action behaviors related to the target data interfaces in the sample access behavior sequences is greater than a preset number. Here, the target data interfaces may be each data interface for the access party to acquire order information, and the data interfaces related to the sample access behavior sequences are data interfaces accessed by the sample access action behaviors in the sample action behavior sequence included in the sample access behavior sequences. The sequence features are features corresponding to the first sample access behavior sequences, the second sample access behavior sequences and the third sample access behavior sequences. For example, the sequence feature corresponding to the first sample access behavior sequences is that the sample access party is a sample access party with abnormal behaviors, the sequence feature corresponding to the second sample access behavior sequences is that the sample access party is a sample access party that has no abnormal behavior and is not hit by a preset abnormality detection strategy, and the sequence feature corresponding to the third sample access behavior sequences is that the sample access party is a sample access party hit by the preset abnormality detection strategy.

For example, the preset sample screening rules may be used to screen out sample action behavior sequences with a sequence length within a single hour greater than a preset length and/or the number of sample access action behaviors accessing the target data interfaces greater than a preset number from the sample data set, and sample access behavior sequences corresponding to the selected sample action behavior sequences are used as sample access behavior sequences to be classified. In this way, preliminary noise reduction of the sample data set may be realized by using the preset sample screening rules.

After obtaining the sample access behavior sequences to be classified, each first sample access behavior sequence, each second sample access behavior sequence and each third sample access behavior sequence may be obtained from the sample access behavior sequences to be classified according to the sequence features corresponding to each sample access behavior sequence and the sample access parties corresponding to the sample access behavior sequences to be classified.

In S2-2, using the network model to be trained to learn sample access action behaviors and sample time intervals corresponding to the first sample access behavior sequences, the second sample access behavior sequences and the third sample access behavior sequences respectively to obtain the identification model.

Here, regardless of the first sample access behavior sequences, the second sample access behavior sequences or the third sample access behavior sequences, sample access action behaviors corresponding to these sample access behavior sequences are access action behaviors in the sample action behavior sequences included in the sample access behavior sequences, and sample time intervals corresponding to these sample access behavior sequences are time intervals in the sample time interval sequences included in the sample access behavior sequences.

In concrete implementation, the first sample access behavior sequences, the second sample access behavior sequences and the third sample access behavior sequences may be input to the network model to be trained, so that the network model to be trained can learn access action information, interface information and time information in different types of sample access behavior sequences, so as to obtain the identification model.

For example, the first sample access behavior sequences, the second sample access behavior sequences and the third sample access behavior sequences may be input to the network model to be trained to obtain a predicted classification probability of the network model to be trained. Here, the predicted classification probability is used for indicating the probability that the sample access party corresponding to the sample access behavior sequence has abnormal behaviors. Then, according to standard classification probabilities corresponding to each sample access behavior sequence, predicted loss of the network model to be trained is determined. Then, iterative training is performed on the network model to be trained by using the predicted loss until a training stop condition is met, so as to obtain a trained identification model. Here, the training stop condition may be that the number of rounds of iterative training reaches a preset round number and/or a prediction accuracy of the trained identification model reaches a preset accuracy.

In an embodiment, in order to further reduce the noise samples in the second sample access behavior sequences and the third sample access behavior sequences, as shown in FIG. 7F, the above S2-2 may be implemented according to the following steps.

In S2-2-1, using the network model to be trained to learn sample access action behaviors and sample time intervals corresponding to the first sample access behavior sequences and the second sample access behavior sequences respectively to obtain an initial model.

In concrete implementation, the first sample access behavior sequences and the second sample access behavior sequences may be input to the network model to be trained to obtain a predicted classification probability, then the predicted loss may be determined by using the predicted classification probability, and standard classification probabilities corresponding to the first sample access behavior sequences and the second sample access behavior sequences, and iterative training is performed on the network model to be trained by using the predicted loss until a training stop condition is met, so as to obtain an initial model. In this way, the initial model for denoising samples may be constructed by using the first sample access behavior sequences and the second sample access behavior sequences.

In S2-2-2, using the initial model to determine first predicted classification probabilities corresponding to each of the third sample access behavior sequences and second predicted classification probabilities corresponding to each of the second sample access behavior sequences.

Here, the predicted classification probability is used for indicating the probability that the sample access party corresponding to the sample access behavior sequence has abnormal behaviors, and may also indicate the probability of abnormal behaviors in the sample action behavior sequence.

In concrete implementation, each second sample access behavior sequence and each third sample access behavior sequence may be input into the initial model respectively to obtain second predicted classification probabilities corresponding to each second sample access behavior sequence and first predicted classification probabilities corresponding to each third sample access behavior sequence.

In S2-2-3, screening out fourth sample access behavior sequences from the second sample access behavior sequences according to the second predicted classification probabilities and screening out fifth sample access behavior sequences from the third sample access behavior sequences according to the first predicted classification probabilities.

In concrete implementation, each fourth sample access behavior sequence with the second predicted classification probability greater than a specified threshold may be screened out from the second sample access behavior sequences, and each fifth sample access behavior sequence with the first predicted classification probability greater than the specified threshold may be screened out from the third sample access behavior sequences.

Here, the second sample access behavior sequences with the second predicted classification probabilities less than the specified threshold are noise samples in the white samples, which are close to black samples, and the fourth sample access behavior sequences screened out are relatively pure white samples with fewer noise samples. The third sample access behavior sequences with the first predicted classification probabilities less than the preset threshold are noise samples in the black samples, which are close to white samples, and the fifth sample access behavior sequences screened out are relatively pure black samples with fewer noise samples. The fifth sample access behavior sequences screened out are usually merged with the first sample access behavior sequences to increase the volume of black samples.

In S2-2-4, performing iterative training on the network model to be trained by using the fourth sample access behavior sequences, the fifth sample access behavior sequences and the first sample access behavior sequences to obtain the identification model.

In concrete implementation, the fifth sample access behavior sequences and the first sample access behavior sequences may be merged into black samples, the fourth sample access behavior sequences may be used as white samples, and iterative training is performed on the network model to be trained by using the black and white samples, so as to construct a desired identification model.

Figure 4:
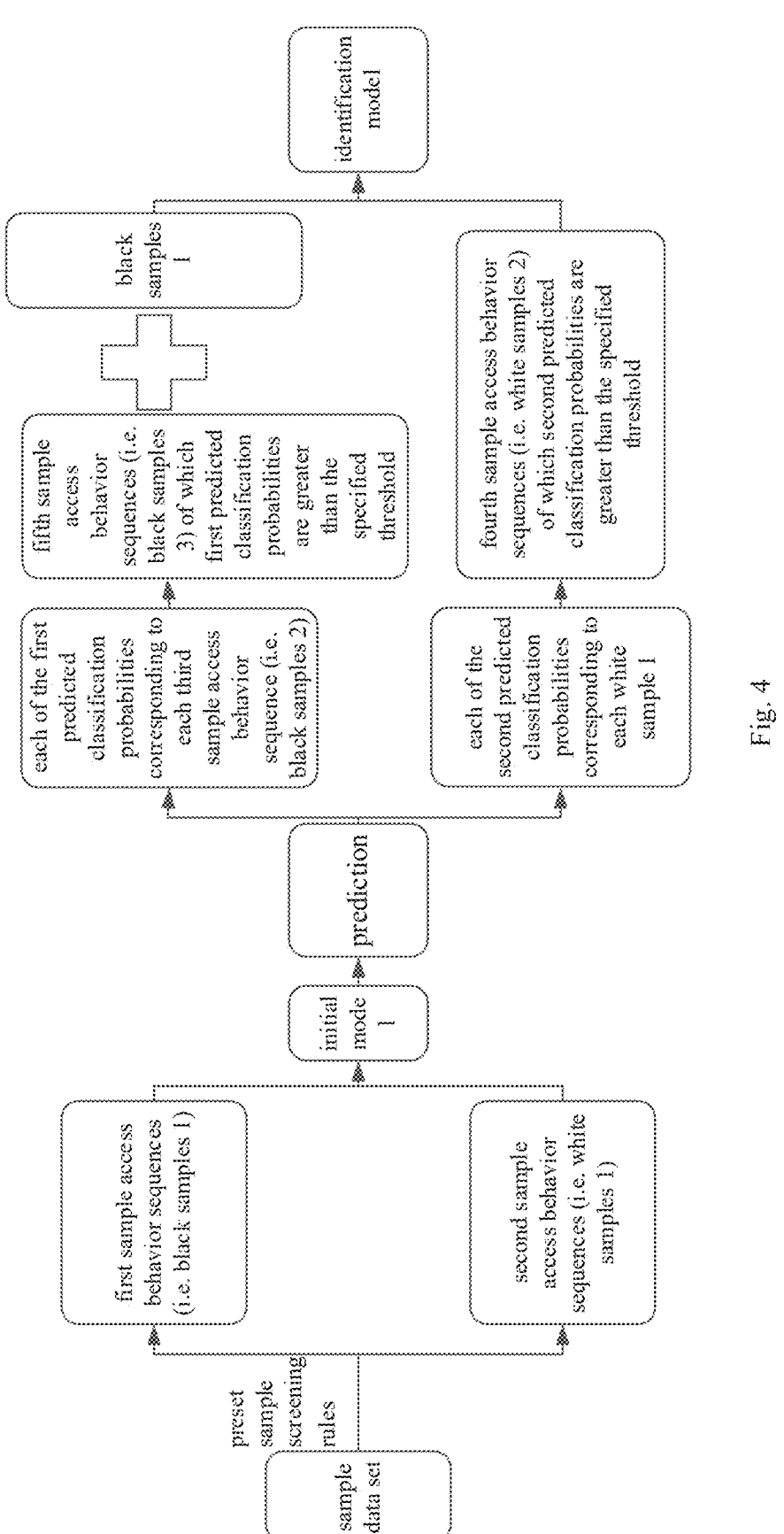
FIG. 4 is a flowchart of training to obtain an identification model according to an embodiment of the present disclosure.

As shown in FIG. 4 which is a flowchart of training to obtain an identification model according to an embodiment of the present disclosure, after obtaining the sample data set, first sample access behavior sequences (i.e. black samples 1) and second sample access behavior sequences (i.e. white samples 1) may be screened out by using the preset sample screening rules and the sequence features corresponding to each sample access behavior sequence. Then, an initial model may be constructed by using the black samples 1 and the white samples 1. After that, the initial model may be used for predicting each of the first predicted classification probabilities corresponding to each third sample access behavior sequence (i.e. black samples 2) and predicted each of the second predicted classification probabilities corresponding to each white sample 1. Fifth sample access behavior sequences (i.e. black samples 3) of which first predicted classification probabilities are greater than the specified threshold are screened out from the black samples 2, and fourth sample access behavior sequences (i.e. white samples 2) of which second predicted classification probabilities are greater than the specified threshold are screened out from the white samples 1. The black samples 3 and the black samples 1 are combined into black samples, and an identification model is constructed by using the black samples and the white samples 2.

In one embodiment, as shown in FIG. 7G, S2-2-4 may be implemented according to the following steps.

In S2-2-4-1, inputting target sample access behavior sequences into the network model to be trained to obtain sample sequence fusion information corresponding to the target sample access behavior sequences.

The sample sequence fusion information includes a plurality of sample fusion features related to interfaces and time, and the target sample access behavior sequence is one selected from the group consisting of the fourth sample access behavior sequence, the fifth sample access behavior sequence and the first sample access behavior sequence. The target sample access behavior sequences include a target sample action behavior sequence and a target sample time interval sequence, which have the same sequence length.

For example, the network model to be trained may perform embedding on sample action identifications corresponding to each sample access action behavior in the target sample action behavior sequence, to obtain each first sample feature vector, and perform embedding on each sample time interval in the target sample time interval sequence to obtain each second sample feature vector.

Then, a first sample sequence tensor corresponding to the target sample action behavior sequence may be determined according to a sequence length of the target sample action behavior sequence and each first sample feature vector, and a second sample sequence tensor corresponding to the target sample time interval sequence may be determined according to a sequence length of the target sample time interval sequence and each second sample feature vector. Then, the first sample sequence tensor and the second sample sequence tensor may be fused to obtain sample sequence fusion information.

It should be noted that if the number of batch used in the training of the model is q, q target sample access action sequences may be input to the network model to be trained at one time.

In S2-2-4-2, determining third predicted classification probabilities according to the sample sequence fusion information.

Here, the third predicted classification probabilities are used for indicating the probabilities of abnormal behaviors in the target sample action behavior sequence included in the target sample access behavior sequences, and may also be used for indicating the probability that a sample access party corresponding to the target sample access behavior sequences has abnormal behaviors.

In concrete implementation, after obtaining the sample sequence fusion information, a target NLP model branch may be directly used to perform sequence feature learning on the sample sequence fusion information to obtain sample sequence features corresponding to the sample sequence fusion information. Then, FC layers may be used to perform full connection processing on the sample sequence features, and a classification module may be used to classify the processed sample sequence features to obtain the third predicted classification probabilities corresponding to the target sample access behavior sequences.

In S2-2-4-3, determining a predicted loss according to the third predicted classification probabilities, and standard classification probabilities corresponding to the target sample access behavior sequences, and performing iterative training on the network model to be trained by using the predicted loss until a training stop condition is met, so as to obtain the identification model.

Here, when the target sample access behavior sequence is the first sample access behavior sequence, the standard classification probability is 1; when the target sample access behavior sequence is the fourth sample access behavior sequence, the standard classification probability is 0; and when the target sample access behavior sequence is the fifth sample access behavior sequence, the standard classification probability is 1.

For example, the predicted loss of the network model to be trained may be determined according to the third predicted classification probabilities and standard classification probabilities corresponding to the target sample access behavior sequences. After that, iterative training may be performed on the network model to be trained by using the predicted loss until a training stop condition is met, so as to obtain a trained identification model.

In one embodiment, because different NLP models have different use effects, in order to improve the prediction accuracy of the trained identification model, in the process of training the network model to be trained, a target NLP model may be selected from a variety of candidate NLP models, and an identification model including the target NLP model may be trained. Specifically, as shown in FIG. 7H, S2-2-4-2 may be implemented according to the following steps.

In S2-2-4-2-1, inputting the sample sequence fusion information to a plurality of candidate language processing branches to obtain sample sequence features learned by the plurality of candidate language processing branches.

Here, a plurality of candidate language processing branches, namely a plurality of candidate NLP model branches, may be deployed in the network model to be trained. For example, the network model to be trained may be deployed with, including but not limited to, candidate LSTM branches, candidate TextCnn branches and candidate transformer branches.

After obtaining the sample sequence fusion information, the sample sequence fusion information may be input to the each of candidate language processing branches to obtain sample sequence features learned by each of candidate language processing branches.

In S2-2-4-2-2, determining third predicted classification probabilities corresponding to each of the candidate language processing branches according to each of the sample sequence features.

In concrete implementation, the sample sequence features learned by each of the candidate language processing branches may be subjected to full connection processing and classification processing, so as to obtain third predicted classification probabilities for the target sample access behavior sequences output by the network model to be trained when each of the candidate language processing branches is used.

Further, for the step of determining the predicted loss in S2-2-4-3, a target language processing branch may be screened out first from the plurality of candidate language processing branches according to each of the third predicted classification probabilities and standard classification probabilities.

For example, a target language processing branch with the best prediction effect may be selected from the plurality of candidate language processing branches according to a large number of target sample access behavior sequences, the corresponding third predicted classification probabilities when using different candidate language processing branches, and the standard classification probabilities corresponding to the target sample access behavior sequences. For example, a candidate language processing branch with a difference between the predicted classification probability and the standard classification probability less than a preset difference value and the number of target sample access behavior sequences corresponding to such predicted classification probability greater than a preset sequence number may be taken as the target language processing branch.

Then, the predicted loss may be determined according to a fourth predicted classification probability corresponding to the target language processing branch and the standard classification probabilities.

For example, after the target language processing branch is determined, the predicted loss of the network model to be trained may be determined according to the predicted classification probability output when using the target language processing branch and the standard classification probabilities corresponding to the target sample access behavior sequences, and iterative training is performed on the network model to be trained by using the predicted loss until a training stop condition is met, so as to obtain an identification model including the target language processing branch. Here, after the target language processing branch is determined, each of the candidate language processing branches except the target language processing branch deployed in the network model to be trained may be deleted to obtain a network model to be trained that only includes the target language processing branch. Then, iterative training may be performed on the network model to be trained by using the determined predicted loss, so as to obtain an identification model including only the target language processing branch.

In this way, by adopting the end-to-end (sample access end to model end) deep learning modeling method, the identification model that can learn the action sequences and time sequences of the interface itself can be trained without manually mining the features corresponding to the sample access behavior sequences, thus being beneficial to improving the identification accuracy of the identification model for the access actions of unauthorized access parties and improving the interception accuracy for the interface access actions. Moreover, by constructing the initial model first, and using the initial model to denoise the sample access behavior sequences, the purity of black and white samples is improved under the condition of saving human resources, and the problem of unbalanced sample numbers of the black and white samples is effectively solved. Using the balanced black and white samples for feature learning helps to prevent the model from being biased towards a particular type of sample, resulting in improved accuracy in distinguishing between black and white samples and reducing misidentification.

It can be understood by those skilled in the art that in the above-mentioned method according to specific implementation modes, the order of writing the steps does not necessarily imply a strict execution sequence or impose any limitations on the implementation process. The specific execution sequence of each step should be determined based on its functionality and possible inherent logic.

Based on the same inventive concept, an embodiment of the present disclosure also provides an interface access processing apparatus corresponding to the interface access processing method. Since the principle of solving problems by the apparatus in the embodiment of the present disclosure is similar to the above-mentioned interface access processing method, the implementation of the method can be used as a reference for the implementation of the apparatus, which will not be repeated here.

Figure 5:
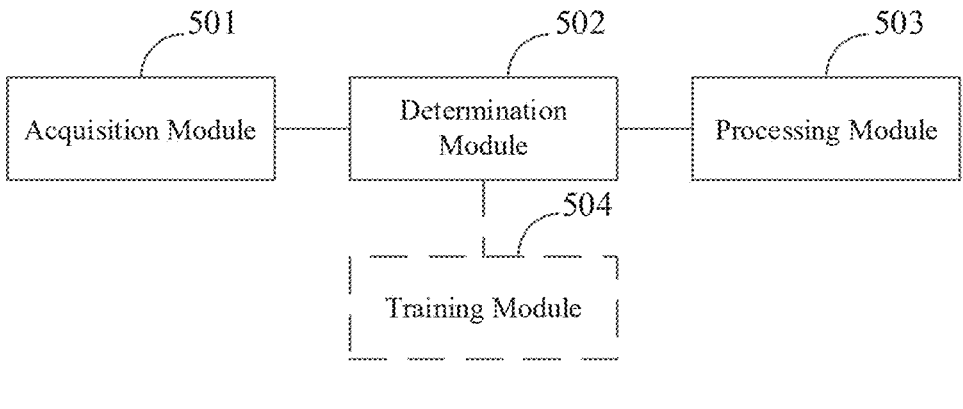
FIG. 5 is a schematic diagram of an interface access processing apparatus according to an embodiment of the present disclosure.

As shown in FIG. 5 which is schematic diagram of an interface access processing apparatus according to an embodiment of the present disclosure, the apparatus includes:

an acquisition module 501, configured to acquire target access behavior sequences of an access party within a first specified time range, the target access behavior sequences comprising an access action behavior sequence and an access time interval sequence, the access action behavior sequence being used for recording interface access action behaviors of the access party in chronological order of access time, and the access time interval sequence being used for recording time intervals between adjacent actions in the access action behaviors sequence in chronological order of access time;

a determination module 502, configured to call an identification model for prediction processing to obtain an identification result based on the access action sequence and the access time interval sequence, the identification result being used for representing a classification probability that the access party has abnormal behaviors; and a processing module 503, configured to control an interface access request within a second specified time range of the access party according to the identification result, a start time of the second specified time range being later than an end time of the first specified time range.

In a possible implementation, the processing module 503, when controlling the interface access request within the second specified time range of the access party according to the identification result, is configured to:

in response to the classification probability in the identification result being greater than a specified threshold, intercept the interface access request initiated by the access party within the second specified time range; or, in response to the classification probability in the identification result being not greater than the specified threshold, allow the interface access request initiated by the access party within the second specified time range.

In a possible implementation, the determination module 502, when calling the identification model for prediction processing to obtain the identification result based on the access action sequence and the access time interval sequence, is configured to:

call the identification model to perform sequence fusion on the access action behavior sequence and the access time interval sequence to obtain target sequence fusion information; and learn the target sequence fusion information to obtain a sequence feature, and performing prediction based on the sequence feature to obtain the identification result.

In a possible implementation, the determination module 502, when learning the target sequence fusion information to obtain the sequence feature, is configured to:

use a natural language processing branch to perform feature conversion processing and learning on the target sequence fusion information to obtain the sequence feature.

In a possible implementation, the access action behavior sequence and the access time interval sequence have a same sequence length; and the determination module 502, when calling the identification model to perform sequence fusion on the access action behavior sequence and the access time interval sequence to obtain target sequence fusion information, is configured to:

call the identification model to perform feature vectorization processing on each of the interface access action behaviors in the access action behavior sequence to obtain each of first feature vectors, respectively, and perform feature vectorization processing on each of the time intervals in the access time interval sequence to obtain each of second feature vectors, respectively;

determine a first sequence tensor corresponding to the access action behavior sequence according to the sequence length and each of the first feature vectors, and determine a second sequence tensor corresponding to the access time interval sequence according to the sequence length and each of the second feature vectors; and fuse the first sequence tensor and the second sequence tensor to obtain the target sequence fusion information.

In a possible implementation, the apparatus further includes:

a training module 504, configured to acquire a sample data set, the sample data set including a plurality of sample access behavior sequences from a plurality of sample access parties, and the sample access behavior sequences including sample action behavior sequences and sample time interval sequences of the sample access parties; and use a network model to be trained to learn each sample access action behavior in the sample action behavior sequences and each sample time interval in the sample time interval sequences among the sample access behavior sequences to obtain the identification model.

In a possible implementation, the training module 504, when using the network model to be trained to learn each sample access action behavior in the sample action behavior sequences and each sample time interval in the sample time interval sequences among the sample access behavior sequences to obtain the identification model, is configured to:

screen out first sample access behavior sequences, second sample access behavior sequences and third sample access behavior sequences from the sample data set, the first sample access behavior sequence being sample access behavior sequences of a sample access party with abnormal behaviors within a third specified time range, the second sample access behavior sequence being sample access behavior sequences of a sample access party that has no abnormal behavior and is not hit by a preset abnormality detection strategy, the third sample access behavior sequence being sample access behavior sequences of a sample access party hit by the preset abnormality detection strategy within the third specified time range, and the preset abnormality detection strategy being used for detecting whether an access action behavior of the sample access party has access risk; and use the network model to be trained to learn sample access action behaviors and sample time intervals corresponding to the first sample access behavior sequences, the second sample access behavior sequences and the third sample access behavior sequences respectively to obtain the identification model.

In a possible implementation, the training module 504, when using the network model to be trained to learn sample access action behaviors and sample time intervals corresponding to the first sample access behavior sequences, the second sample access behavior sequences and the third sample access behavior sequences respectively to obtain the identification model, is configured to:

use the network model to be trained to learn sample access action behaviors and sample time intervals corresponding to the first sample access behavior sequences and the second sample access behavior sequences respectively to obtain an initial model;

use the initial model to determine first predicted classification probabilities corresponding to each of the third sample access behavior sequences and second predicted classification probabilities corresponding to each of the second sample access behavior sequences;

screen out fourth sample access behavior sequences from the second sample access behavior sequences according to the second predicted classification probabilities, and screen out fifth sample access behavior sequences from the third sample access behavior sequences according to the first predicted classification probabilities; and perform iterative training on the network model to be trained by using the fourth sample access behavior sequences, the fifth sample access behavior sequences and the first sample access behavior sequences to obtain the identification model.

In a possible implementation, the training module 504, when performing iterative training on the network model to be trained by using the fourth sample access behavior sequences, the fifth sample access behavior sequences and the first sample access behavior sequences to obtain the identification model, is configured to:

input target sample access behavior sequences into the network model to be trained to obtain sample sequence fusion information corresponding to the target sample access behavior sequences, the target sample access behavior sequence being one selected from a group consisting of the fourth sample access behavior sequence, the fifth sample access behavior sequence and the first sample access behavior sequence;

determine third predicted classification probabilities according to the sample sequence fusion information; and determine a predicted loss according to the third predicted classification probabilities and standard classification probabilities corresponding to the target sample access behavior sequences, and perform iterative training on the network model to be trained by using the predicted loss until a training stop condition is met, so as to obtain the identification model.

In a possible implementation, the training module 504, when determining third predicted classification probabilities according to the sample sequence fusion information, is configured to:

input the sample sequence fusion information to a plurality of candidate language processing branches to obtain sample sequence features learned by the plurality of candidate language processing branches; and determine third predicted classification probabilities corresponding to each of the candidate language processing branches according to each of the sample sequence features; and determine the predicted loss according to the third predicted classification probabilities and standard classification probabilities corresponding to the target sample access behavior sequences includes:

screen out a target language processing branch from the plurality of candidate language processing branches according to each of the third predicted classification probabilities and the standard classification probabilities; and determine the predicted loss according to a fourth predicted classification probability corresponding to the target language processing branch and the standard classification probabilities.

In a possible implementation, the training module 504, when screening out first sample access behavior sequences, second sample access behavior sequences and third sample access behavior sequences from the sample data set, is configured to:

screen out each of the first sample access behavior sequences, the second sample access behavior sequences and the third sample access behavior sequences from the sample data set by using preset sample screening rules and sequence features corresponding to each sample access behavior sequence, the preset sample screening rules including that a sequence length of the sample access behavior sequence within a third preset time range is greater than a preset length, and/or that data interfaces related to the sample access behavior sequences include target data interfaces and a number of sample access action behaviors related to the target data interfaces in the sample access behavior sequences is greater than a preset number.

The description of the processing flow of each module in the device and the interaction flow between each module can refer to the relevant description in the above method embodiment, and will not be described in detail here.

Figure 6:
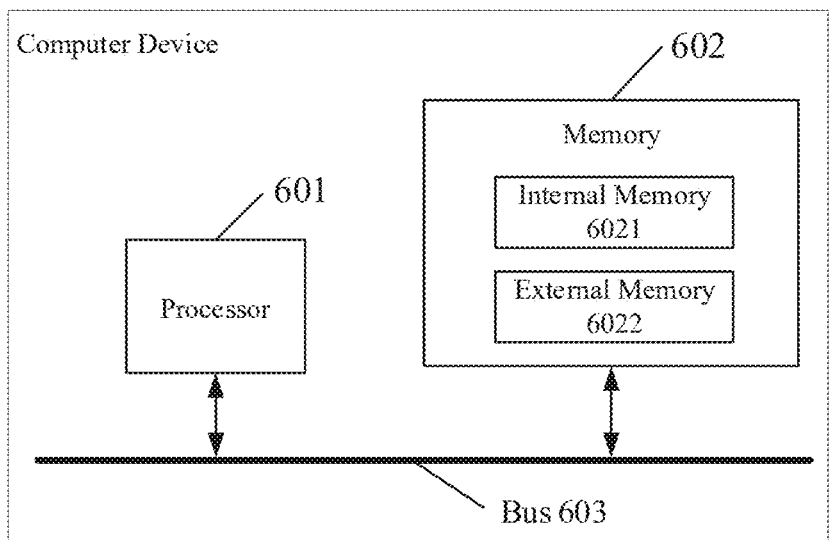
FIG. 6 is a structural diagram of a computer device according to an embodiment of the present disclosure.

Based on the same technical concept, an embodiment of the present application also provides a computer device. As shown in FIG. 6, which is a structural diagram of a computer device according to an embodiment of the present disclosure, the computer device includes:

a processor 601, a memory 602 and a bus 603. The memory 602 stores machine-readable instructions executable by the processor 601, the processor 601 is used for executing the machine-readable instructions stored in the memory 602, and when the machine-readable instructions are executed by the processor 601, the processor 601 executes the following steps: S101, acquiring target access behavior sequences of an access party within a first specified time range, the target access behavior sequences comprising an access action behavior sequence and an access time interval sequence, the access action behavior sequence being used for recording interface access action behaviors of the access party in chronological order of access time, and the access time interval sequence being used for recording time intervals between adjacent actions in the access action behaviors sequence in chronological order of access time; S102, calling an identification model for prediction processing to obtain an identification result based on the access action sequence and the access time interval sequence, the identification result being used for representing a classification probability that the access party has abnormal behaviors; and S103, controlling an interface access request within a second specified time range of the access party according to the identification result, a start time of the second specified time range being later than an end time of the first specified time range The memory 602 includes an internal memory 6021 and an external memory 6022. Here, the internal memory 6021, also called internal storage, is used for temporarily storing operation data in the processor 601 and data exchanged with the external memory 6022 such as a hard disk. The processor 601 exchanges data with the external memory 6022 through the internal memory 6021. When the computer device runs, the processor 601 communicates with the memory 602 through the bus 603, so that the processor 601 executes the instructions mentioned in the above method embodiment.

An embodiment of the present disclosure also provides a computer-readable storage medium, on which a computer program is stored, and when the computer program is run by a processor, the steps of the interface access processing method described in the above method embodiment are executed. The storage medium may be a volatile or non-volatile computer-readable storage medium.

A computer program product of the interface access processing method provided by an embodiment of the present disclosure includes a computer-readable storage medium in which a program code is stored, and the program code includes instructions that can be used to execute the steps of the interface access processing described in the above method embodiment. For details, please refer to the above-mentioned method embodiment, which is not repeated here.

The above computer program product can be implemented through hardware, software, or their combination. In one alternative embodiment, the computer program product is embodied as a computer storage medium, and in another alternative embodiment, the computer program product is embodied as a software product, such as a Software Development Kit (SDK).

It can be clearly understood by those skilled in the art that for the convenience and conciseness of description, to understand the specific working process of the system and apparatus described above, one can refer to the corresponding process in the aforementioned method embodiment, which will not be repeated here. In several embodiments provided by the present disclosure, it should be understood that the disclosed system, apparatus and method can be realized in other ways. The apparatus embodiment described above is only schematic. For example, the division of the units is only a logical function division, and there may be other division methods in actual implementation. For another example, multiple units or components may be combined or integrated into another system, or some features may be ignored or not implemented. Furthermore, the displayed or discussed coupling or direct coupling or communication can be indirect coupling or communication through some communication interfaces, apparatuses, or units, which can be electrical, mechanical, or in other forms ⊠

The above-mentioned units illustrated as separate components may be, or may not be physically separated, and the components displayed as units may be, or may not be, physical units, that is, they may be at one place, or may also be distributed to a plurality of network units; and some or all of the units may be selected according to actual needs to achieve the purpose of the solutions of the present embodiment.

In addition, the respective functional units in the respective embodiments of the present disclosure may be integrated in one processing unit, or each unit may physically exist separately, or two or more units may be integrated in one unit.

In the case where the integrated unit is implemented in a form of software functional unit and sold or used as an independent product, the integrated unit may be stored in a computer readable storage medium. Based on such understanding, the technical solutions of the present disclosure, in essence, or the part that contributes to the prior art, or all or part of the technical solutions, may be embodied in a form of a software product; the computer software product is stored in a storage medium and includes several instructions so that a computer device (which may be a personal computer, a server, or a network device, etc.) to execute all or part of steps of the methods according to the respective embodiments of the present disclosure. The foregoing storage medium includes a USB flash disk, a removable hard disk, a Read-Only Memory (ROM), a Random Access Memory (RAM), a magnetic disk or an optical disk, and various other media that can store program codes.

If the technical scheme of the present disclosure involves personal information, the products applying the technical scheme of the present disclosure should clearly inform the rules for personal information processing and obtain the individual's voluntary consent before processing personal information. If the technical scheme of the present disclosure involves sensitive personal information, the products applying the technical scheme of the present disclosure should secure individual separate consent before processing such sensitive personal information, and simultaneously meet the criteria for "explicit consent". For instance, at personal information collection devices such as cameras, clear and conspicuous signs should be placed to inform individuals that they have entered the range of personal information collection, and that their personal information will be collected. If individuals voluntarily enter the collection range, it will be considered as consent to the collection of their personal information. Alternatively, on devices for personal information processing, individual authorization can be obtained by using conspicuous signs/information to inform individuals of the rules for personal information processing, via pop-up messages, or by requesting individuals to upload their personal information themselves, and so on. The rules for personal information processing may include the personal information processor, the purpose of personal information processing, the processing methods, the types of personal information being processed, and other information.

Finally, it should be noted that the above-mentioned embodiments are only concrete implementations of the present disclosure, which are used to illustrate the technical scheme of the present disclosure, but not to limit it. The protection scope of the present disclosure is not limited to these embodiments. Although the present disclosure has been described in detail with reference to the above-mentioned embodiments, it should be understood by those of ordinary skill in the art that any technician familiar with the technical field can still modify or easily think of changes to the technical scheme recorded in the above-mentioned embodiments within the technical scope of the present disclosure, or equivalently replace certain technical features described in the aforementioned embodiments. These modifications, changes or substitutions do not make the essence of the corresponding technical scheme deviate from the spirit and scope of the technical scheme of the embodiments of the present disclosure, and should be included in the protection scope of the present disclosure. Therefore, the scope of protection of the present disclosure should be based on the scope of protection of the claims.

The invention claimed is:

1. A method of detecting an abnormal behavior and intercepting a request for accessing a network interface by monitoring and analyzing network traffic data, comprising:

acquiring interface traffic data associated with the network interface;

identifying target access behavior sequences of an access party within a first specified time range from the interface traffic data, the target access behavior sequences comprising an access action behavior sequence and an access time interval sequence, the access action behavior sequence recording interface access action behaviors of the access party in achronological order of accessing the network interface, and the access time interval sequence recording time intervals between adjacent interface access action behaviors in the access action behavior sequence;

inputting the access action behavior sequence and the access time interval sequence into a trained neural network model, wherein the trained neural network model comprises an end-to-end active machine learning model;

generating a plurality of first feature vectors by the trained neural network model performing feature vectorization processing on each of the interface access action behaviors in the access action behavior sequence;

generating a plurality of second feature vectors by the trained neural network model performing feature vectorization on each of the time intervals in the access time interval sequence;

generating a first sequence tensor corresponding to the access action behavior sequence based on a length of the access action behavior sequence and the plurality of first feature vectors, generating a second sequence tensor corresponding to the access time interval sequence based on a length of the access time interval sequence and the plurality of second feature vectors;

generating target sequence fusion information by the trained neural network model fusing the first sequence tensor and the second sequence tensor;

generating a sequence feature by the trained neural network model learning from the target sequence fusion information, wherein the sequence feature comprises a unified characterization vector characterizing a feature learned from the target sequence fusion information;

generating an identification result based on the sequence feature by the trained neural network model, wherein the identification result comprises a classification probability of a presence of the abnormal behavior; and intercepting the request for accessing the network interface within a second specified time range of the access party in response to determining that the classification probability is greater than a specified threshold, a start time of the second specified time range being later than an end time of the first specified time range.

2. The method according to claim 1, further comprising:

in response to determining that the classification probability is not greater than the specified threshold, allowing an interface access request initiated by the access party within the second specified time range.

3. The method according to claim 1, wherein the generating a sequence feature by the trained neural network model learning from the target sequence fusion information comprises:

generating the sequence feature by utilizing a natural language processing branch to perform feature conversion processing and learning on the target sequence fusion information.

4. The method according to claim 1, wherein the access action behavior sequence and the access time interval sequence have a same sequence length.

5. The method according to claim 1, wherein the trained neural network model is obtained by:

acquiring a sample data set, the sample data set comprising a plurality of sample access behavior sequences from a plurality of sample access parties, and the sample access behavior sequences comprising sample action behavior sequences and sample time interval sequences of the sample access parties; and training the neural network model to learn each sample access action behavior in the sample action behavior sequences and each sample time interval in the sample time interval sequences among the sample access behavior sequences.

6. The method according to claim 5, wherein the training the neural network model to learn each sample access action behavior in the sample action behavior sequences and each sample time interval in the sample time interval sequences among the sample access behavior sequences comprises:

screening out first sample access behavior sequences, second sample access behavior sequences and third sample access behavior sequences from the sample data set, the first sample access behavior sequence being sample access behavior sequences of a sample access party with abnormal behaviors within a third specified time range, the second sample access behavior sequence being sample access behavior sequences of a sample access party that has no abnormal behavior and is not hit by a preset abnormality detection strategy, the third sample access behavior sequence being sample access behavior sequences of a sample access party hit by the preset abnormality detection strategy within the third specified time range, and the preset abnormality detection strategy being used for detecting whether an access action behavior of the sample access party has access risk; and training the neural network model to learn sample access action behaviors and sample time intervals corresponding to the first sample access behavior sequences, the second sample access behavior sequences and the third sample access behavior sequences respectively.

7. The method according to claim 6, wherein the screening out first sample access behavior sequences, second sample access behavior sequences and third sample access behavior sequences from the sample data set comprises:

screening out each of the first sample access behavior sequences, the second sample access behavior sequences and the third sample access behavior sequences from the sample data set by using preset sample screening rules and sequence features corresponding to each sample access behavior sequence, the preset sample screening rules comprising that a sequence length of the sample access behavior sequence within a third preset time range is greater than a preset length, and/or that data interfaces related to the sample access behavior sequences comprise target data interfaces and a number of sample access action behaviors related to the target data interfaces in the sample access behavior sequences is greater than a preset number.

8. A computer device of detecting an abnormal behavior and intercepting a request for accessing a network interface by monitoring and analyzing network traffic data, comprising a processor and a memory, wherein the memory stores machine-readable instructions executable by the processor, the machine-readable instructions, when executed by the processor, cause the processor to perform operations comprising:

acquiring interface traffic data associated with the network interface;

identifying target access behavior sequences of an access party within a first specified time range from the interface traffic data, the target access behavior sequences comprising an access action behavior sequence and an access time interval sequence, the access action behavior sequence recording interface access action behaviors of the access party in achronological order of accessing the network interface, and the access time interval sequence recording time intervals between adjacent interface access action behaviors in the access action behavior sequence;

inputting the access action behavior sequence and the access time interval sequence into a trained neural network model, wherein the trained neural network model comprises an end-to-end active machine learning model;

generating a plurality of first feature vectors by the trained neural network model performing feature vectorization processing on each of the interface access action behaviors in the access action behavior sequence;

generating a plurality of second feature vectors by the trained neural network model performing feature vectorization on each of the time intervals in the access time interval sequence;

generating a first sequence tensor corresponding to the access action behavior sequence based on a length of the access action behavior sequence and the plurality of first feature vectors, generating a second sequence tensor corresponding to the access time interval sequence based on a length of the access time interval sequence and the plurality of second feature vectors;

generating target sequence fusion information by the trained neural network model fusing the first sequence tensor and the second sequence tensor;

generating a sequence feature by the trained neural network model learning from the target sequence fusion information, wherein the sequence feature comprises a unified characterization vector characterizing a feature learned from the target sequence fusion information;

generating an identification result based on the sequence feature by the trained neural network model, wherein the identification result comprises a classification probability of a presence of the abnormal behavior; and intercepting the request for accessing the network interface within a second specified time range of the access party in response to determining that the classification probability is greater than a threshold, a start time of the second specified time range being later than an end time of the first specified time range.

9. The computer device according to claim 8, the operations further comprising:

in response to determining that the classification probability is not greater than the specified threshold, allowing an interface access request initiated by the access party within the second specified time range.

10. The computer device according to claim 8, wherein the generating a sequence feature by the trained neural network model learning from the target sequence fusion information comprises:

generating the sequence feature by utilizing a natural language processing branch to perform feature conversion processing and learning on the target sequence fusion information.

11. The computer device according to claim 8, wherein the access action behavior sequence and the access time interval sequence have a same sequence length.

12. The computer device according to claim 8, wherein the trained neural network model is obtained by:

acquiring a sample data set, the sample data set comprising a plurality of sample access behavior sequences from a plurality of sample access parties, and the sample access behavior sequences comprising sample action behavior sequences and sample time interval sequences of the sample access parties; and training the neural network model to learn each sample access action behavior in the sample action behavior sequences and each sample time interval in the sample time interval sequences among the sample access behavior sequences.

13. The computer device according to claim 12, wherein the training the neural network model to learn each sample access action behavior in the sample action behavior sequences and each sample time interval in the sample time interval sequences among the sample access behavior sequences comprises:

screening out first sample access behavior sequences, second sample access behavior sequences and third sample access behavior sequences from the sample data set, the first sample access behavior sequence being sample access behavior sequences of a sample access party with abnormal behaviors within a third specified time range, the second sample access behavior sequence being sample access behavior sequences of a sample access party that has no abnormal behavior and is not hit by a preset abnormality detection strategy, the third sample access behavior sequence being sample access behavior sequences of a sample access party hit by the preset abnormality detection strategy within the third specified time range, and the preset abnormality detection strategy being used for detecting whether an access action behavior of the sample access party has access risk; and training the neural network model to learn sample access action behaviors and sample time intervals corresponding to the first sample access behavior sequences, the second sample access behavior sequences and the third sample access behavior sequences respectively.

14. A non-transitory computer-readable storage medium, wherein a computer program is stored on the computer-readable storage medium, and the computer program, when executed by a computer device, causes the computer device to perform operations comprising:

acquiring interface traffic data associated with a network interface;

identifying target access behavior sequences of an access party within a first specified time range from the interface traffic data, the target access behavior sequences comprising an access action behavior sequence and an access time interval sequence, the access action behavior sequence recording interface access action behaviors of the access party in a chronological order of accessing the network interface, and the access time interval sequence recording time intervals between adjacent interface access action behaviors in the access action behavior sequence;

inputting the access action behavior sequence and the access time interval sequence into a trained neural network model, wherein the trained neural network model comprises an end-to-end active machine learning model;

generating a plurality of first feature vectors by the trained neural network model performing feature vectorization processing on each of the interface access action behaviors in the access action behavior sequence;

generating a plurality of second feature vectors by the trained neural network model performing feature vectorization on each of the time intervals in the access time interval sequence;

generating a first sequence tensor corresponding to the access action behavior sequence based on a length of the access action behavior sequence and the plurality of first feature vectors, generating a second sequence tensor corresponding to the access time interval sequence based on a length of the access time interval sequence and the plurality of second feature vectors;

generating target sequence fusion information by the trained neural network model fusing the first sequence tensor and the second sequence tensor;

generating a sequence feature by the trained neural network model learning from the target sequence fusion information, wherein the sequence feature comprises a unified characterization vector characterizing a feature learned from the target sequence fusion information;

generating an identification result based on the sequence feature by the trained neural network model, wherein the identification result comprises a classification probability of a presence of an abnormal behavior; and intercepting a request for accessing the network interface within a second specified time range of the access party in response to determining that the classification probability is greater than a threshold, a start time of the second specified time range being later than an end time of the first specified time range.

15. The method according to claim 1, wherein the trained neural network model is obtained by:

obtaining an initial model by training a network model to learn sample access action behaviors and sample time intervals corresponding to first sample access behavior sequences and second sample access behavior sequences respectively;

generating, by the initial model, first predicted classification probabilities corresponding to each of third sample access behavior sequences and second predicted classification probabilities corresponding to each of the second sample access behavior sequences;

identifying fourth sample access behavior sequences from the second sample access behavior sequences based on the second predicted classification probabilities and identifying fifth sample access behavior sequences from the third sample access behavior sequences based on the first predicted classification probabilities; and performing iterative training on the network model using the fourth sample access behavior sequences, the fifth sample access behavior sequences, and the first sample access behavior sequences.

16. The method according to claim 15, wherein the performing iterative training on the network model to be trained by using the fourth sample access behavior sequences, the fifth sample access behavior sequences and the first sample access behavior sequences to obtain the identification model comprises:

inputting target sample access behavior sequences into the network model to be trained to obtain sample sequence fusion information corresponding to the target sample access behavior sequences, the target sample access behavior sequence being one selected from a group consisting of the fourth sample access behavior sequence, the fifth sample access behavior sequence and the first sample access behavior sequence;

determining third predicted classification probabilities according to the sample sequence fusion information; and determining a predicted loss according to the third predicted classification probabilities and standard classification probabilities corresponding to the target sample access behavior sequences, and performing iterative training on the network model to be trained by using the predicted loss until a training stop condition is met, so as to obtain the identification model.

17. The method according to claim 16, wherein the determining third predicted classification probabilities according to the sample sequence fusion information comprises:

inputting the sample sequence fusion information to a plurality of candidate language processing branches to obtain sample sequence features learned by the plurality of candidate language processing branches; and determining third predicted classification probabilities corresponding to each of the candidate language processing branches according to each of the sample sequence features; and determining the predicted loss according to the third predicted classification probabilities and standard classification probabilities corresponding to the target sample access behavior sequences comprises:

screening out a target language processing branch from the plurality of candidate language processing branches according to each of the third predicted classification probabilities and the standard classification probabilities; and determining the predicted loss according to a fourth predicted classification probability corresponding to the target language processing branch and the standard classification probabilities.

18. The non-transitory computer-readable storage medium according to claim 14, the operations further comprising:

in response to determining that the classification probability is not greater than the specified threshold, allowing an interface access request initiated by the access party within the second specified time range.

19. The non-transitory computer-readable storage medium according to claim 14, wherein the generating a sequence feature by the trained neural network model learning from the target sequence fusion information comprises:

generating the sequence feature by utilizing a natural language processing branch to perform feature conversion processing and learning on the target sequence fusion information.

20. The non-transitory computer-readable storage medium according to claim 14, wherein the access action behavior sequence and the access time interval sequence have a same sequence length.

* * * * *